(12) United States Patent
Meibusch et al.

(10) Patent No.: US 12,737,445 B2
(45) Date of Patent: Sep. 15, 2026

(54) SELECTIVE PASSAGE OF SOFTWARE PACKAGES, BASED ON SIGNED SOFTWARE BILL OF MATERIALS (SBOM)

(71) Applicant: Oracle International Corporation, Redwood Shores, CA (US)

(72) Inventors: David Meibusch, Brisbane City (AU); Christian Rudolf Hoermann, Raleigh, NC (US)

(73) Assignee: Oracle International Corporation, Redwood Shores, CA (US)

( * ) Notice: Subject to any disclaimer, the term of this patent is extended or adjusted under 35 U.S.C. 154(b) by 84 days.

(21) Appl. No.: 18/798,682

(22) Filed: Aug. 8, 2024

(65) Prior Publication Data

US 2026/0044591 A1 Feb. 12, 2026

(51) Int. Cl.
*G06F 21/44* (2013.01)
*G06F 21/56* (2013.01)
*G06Q 10/0875* (2023.01)

(52) U.S. Cl.
CPC ............ *G06F 21/44* (2013.01); *G06F 21/565* (2013.01); *G06Q 10/0875* (2013.01)

(58) Field of Classification Search
CPC ........... G06F 21/44–445; G06F 21/565; G06F 21/57; G06F 21/577; G06F 21/60–604; G06F 21/64–645; G06F 2221/033; G06Q 10/0875
See application file for complete search history.

(56) References Cited

U.S. PATENT DOCUMENTS

2024/0104192 A1* 3/2024 Kalle ...................... G06F 21/52
2025/0147864 A1* 5/2025 Bastien ............... G06F 11/3612

* cited by examiner

*Primary Examiner* — Kevin Bechtel
(74) *Attorney, Agent, or Firm* — Mughal Gaudry & Franklin PC

(57) ABSTRACT

Techniques for selective passage of software packages to a deployment tenancy, based on a signed software bill of materials (SBOM), are described. A SBOM, which is generated for a first software package, is received, wherein the first software package is built from a source code. An analysis is performed on (i) the SBOM, (ii) at least first one or more sections of the source code, and/or (iii) an intermediate representation of at least second one or more sections of the source code. Responsive on passing the analysis, the SBOM is digitally signed to generate a signed SBOM. A second software package is received. A verification is performed as to whether the signed SBOM corresponds to the second software package. Responsive at least in part on a verification that the signed SBOM corresponds to the second software package, passage of the second software package to a deployment tenancy is allowed.

18 Claims, 8 Drawing Sheets

SELECTIVE PASSAGE OF SOFTWARE PACKAGES, BASED ON SIGNED SOFTWARE BILL OF MATERIALS (SBOM)

BACKGROUND

A cloud provider provides on-demand, scalable computing resources (e.g., a cloud environment) to its cloud customers. A cloud customer generally desires to run its cloud resources without monitoring, scanning, or other interference by the cloud provider or other cloud customer. Therefore, the cloud provider offers "tenancies" to its cloud customers. A tenancy is an isolated partition within the cloud environment, such that resources in different tenancies are isolated from each other unless explicitly shared. Each tenancy runs a plurality of virtual machine compute instances.

BRIEF SUMMARY

In some embodiments, a computer-implemented method includes receiving a software bill of material (SBOM) that is generated for a first software package, wherein the first software package is built from a source code; analyzing one or more of (i) the SBOM, (ii) at least first one or more sections of the source code, and (iii) an intermediate representation of at least second one or more sections of the source code; digitally signing the SBOM, to generate a signed SBOM; receiving a second software package; verifying that the signed SBOM corresponds to the second software package; and responsive at least in part on verifying that the signed SBOM corresponds to the second software package, allowing passage of the second software package.

In an example, the second software package is received and verified by a verification service, and wherein verifying that the signed SBOM corresponds to the second software package comprises verifying that the first software package has not been modified since the generation of the SBOM, and the unmodified first software package is received by the verification service as the second software package. In an example, the SBOM comprises one or more of (i) identification of one or more software components of the first software package, (ii) identification of one or more libraries of the first software package, and (iii) hash values of one or more components of the first software package. In an example, the SBOM uniquely identifies the first software package, such that any revision to the first software package results in a mismatch between a revised version of the first software package and the SBOM. In an example, the first software package and the second software package are the same. In an example, the method further includes building, by a build pipeline, the first software package from the source code; and generating, by one or more plugins within the build pipeline, one or more of (i) the SBOM and (ii) the intermediate representation.

In an example, the first software package is built within a first tenancy of a cloud environment; the SBOM is generated from the first software package within the first tenancy of the cloud environment; the intermediate representation is generated from the source code within the first tenancy of the cloud environment; and the analysis of one or more of (i) the SBOM, (ii) at least first one or more sections of the source code, and (iii) the intermediate representation is performed within a second tenancy of the cloud environment, the second tenancy being different from the first tenancy. In an example, digitally signing the SBOM and/or verifying that the signed SBOM corresponds to the second software package are performed within one of (i) the second tenancy of the cloud environment or (ii) a third tenancy of the cloud environment, the third tenancy being different from the first tenancy. In an example, the first tenancy of the cloud environment is controlled by a cloud customer and second tenancy of the cloud environment is controlled by an assurance administrator.

In an example, the analyzing comprises analyzing to detect security vulnerabilities within the first software package and/or the source code; the method further comprises passing the analyzing; and passing the analyzing comprises failing to detect one or more security vulnerabilities within the first software package and/or the source code. In an example, allowing passage of the second software package comprises allowing passage of the second software package to a deployment tenancy of a cloud environment, from where the second software package is to be deployed to a plurality of end user devices or to a cloud-based server. In an example, verification of the signed SBOM is performed at a verification service, and wherein the method further includes prior to verifying that the signed SBOM corresponds to the second software package, verifying a signature of the signed SBOM.

In an example, the source code is first source code, the SBOM is a first SBOM, the signed SBOM is a first signed SBOM, and wherein the method further includes receiving a second SBOM that is generated for a third software package, wherein the third software package is built from a second source code; analyzing one or more of (i) the second SBOM, (ii) at least third one or more sections of the second source code, and (iii) another intermediate representation of at least fourth one or more sections of the second source code; digitally signing the second SBOM to generate a second signed SBOM; receiving a fourth software package; failing to verify that the second signed SBOM corresponds to the fourth software package; and responsive at least in part on failing to verify that the second signed SBOM corresponds to the fourth software package, disallowing passage of the fourth software package to a deployment tenancy of a cloud environment. In an example, a plurality of software packages are deployed from the deployment tenancy, the plurality of software packages including the second software package and excluding the fourth software package. In an example, the source code is first source code, the SBOM is a first SBOM, the signed SBOM is a first signed SBOM, and wherein the method further comprises: receiving a second SBOM that is generated for a third software package, wherein the third software package is built from a second source code; analyzing one or more of (i) the second SBOM, (ii) at least third one or more sections of the second source code, and (iii) another intermediate representation of at least fourth one or more sections of the second source code; detecting one or more security vulnerabilities within the third software package and/or the second source code; and causing revision of the second source code, responsive at least in part on detecting the one or more security vulnerabilities within the third software package and/or the second source code.

In some embodiments, a non-transitory computer-readable medium includes instructions that when executed by one or more processors, cause a system comprising the one or more processors to perform operations including: receiving a software bill of material (SBOM) that is generated for a first software package, wherein the first software package is built from a source code; analyzing one or more of (i) the SBOM, (ii) at least first one or more sections of the source code, and (iii) an intermediate representation of at least second one or more sections of the source code; responsive at least in part on passing the analyzing, digitally signing the SBOM to generate a signed SBOM; receiving a second software package; verifying that the signed SBOM corresponds to the second software package; and responsive at least in part on verifying that the signed SBOM corresponds to the second software package, allowing passage of the second software package. In an example, the SBOM is generated from the first software package within a first tenancy of a cloud environment; and the analyzing is performed within a second tenancy of the cloud environment, the second tenancy being different from the first tenancy. In an example, allowing passage of the second software package comprises: allowing passage of the second software package to a deployment tenancy of a cloud environment, from where the second software package is to be deployed to a plurality of end user devices or to a cloud-based server.

In some embodiments, a system includes one or more processors; and one or more non-transitory computer-readable media storing instructions, which, when executed by the system, cause the system to perform a set of actions including: receiving a software bill of material (SBOM) that is generated for a first software package, wherein the first software package is built from a source code; analyzing one or more of (i) the SBOM, (ii) at least first one or more sections of the source code, and (iii) an intermediate representation of at least second one or more sections of the source code; responsive at least in part on passing the analyzing, digitally signing the SBOM to generate a signed SBOM; receiving a second software package; verifying that the signed SBOM corresponds to the second software package; and responsive at least in part on verifying that the signed SBOM corresponds to the second software package, allowing passage of the second software package. In an example, the SBOM comprises one or more of (i) identification of one or more software components of the first software package, (ii) identification of one or more libraries of the first software package, and (iii) hash values of one or more components of the first software package.

In some embodiments, a system is provided that includes one or more data processors and a non-transitory computer-readable storage medium containing instructions which, when executed on the one or more data processors, cause the one or more data processors to perform part or all of one or more methods disclosed herein.

In other embodiments, a computer-program product is provided that is tangibly embodied in a non-transitory machine-readable storage medium and that includes instructions configured to cause one or more data processors to perform part or all of one or more methods disclosed herein.

Cloud services, microservices, or other machine-hosted services may be offered that perform part or all of one or more methods disclosed herein. The machine-hosted services may be provided by a single machine, by a cluster of machines, or otherwise distributed across machines. The one or more machines may be configured to send and receive data, which may include instructions for performing the methods or results of performing the methods, via an application programming interface (API) or any other communication protocol.

In various embodiments, part or all of one or more methods disclosed herein may be performed by stored instructions such as a software application, computer program, or other software package installed in memory or other storage of a computing platform, such as an operating system, which provides access to physical or virtual computing resources. The operating system may provide access to physical or virtual resources of a mobile computing device, a laptop computing device, a desktop computing device, a server computing device, a container in a virtual machine on a computing device, or any other computing environment configured to execute stored instructions.

As used herein, the terms "first," "second," "third," "fourth," etc. are used as naming conventions to refer to separate items in a set of items. These naming conventions do not imply ordering unless such ordering is explicitly noted using language specific to ordering, such as "before" or "after," or unless such ordering is required to attain the expressly recited functionality, such as generating an item and later accessing the generated item.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure.

DETAILED DESCRIPTION

Figure 1A:
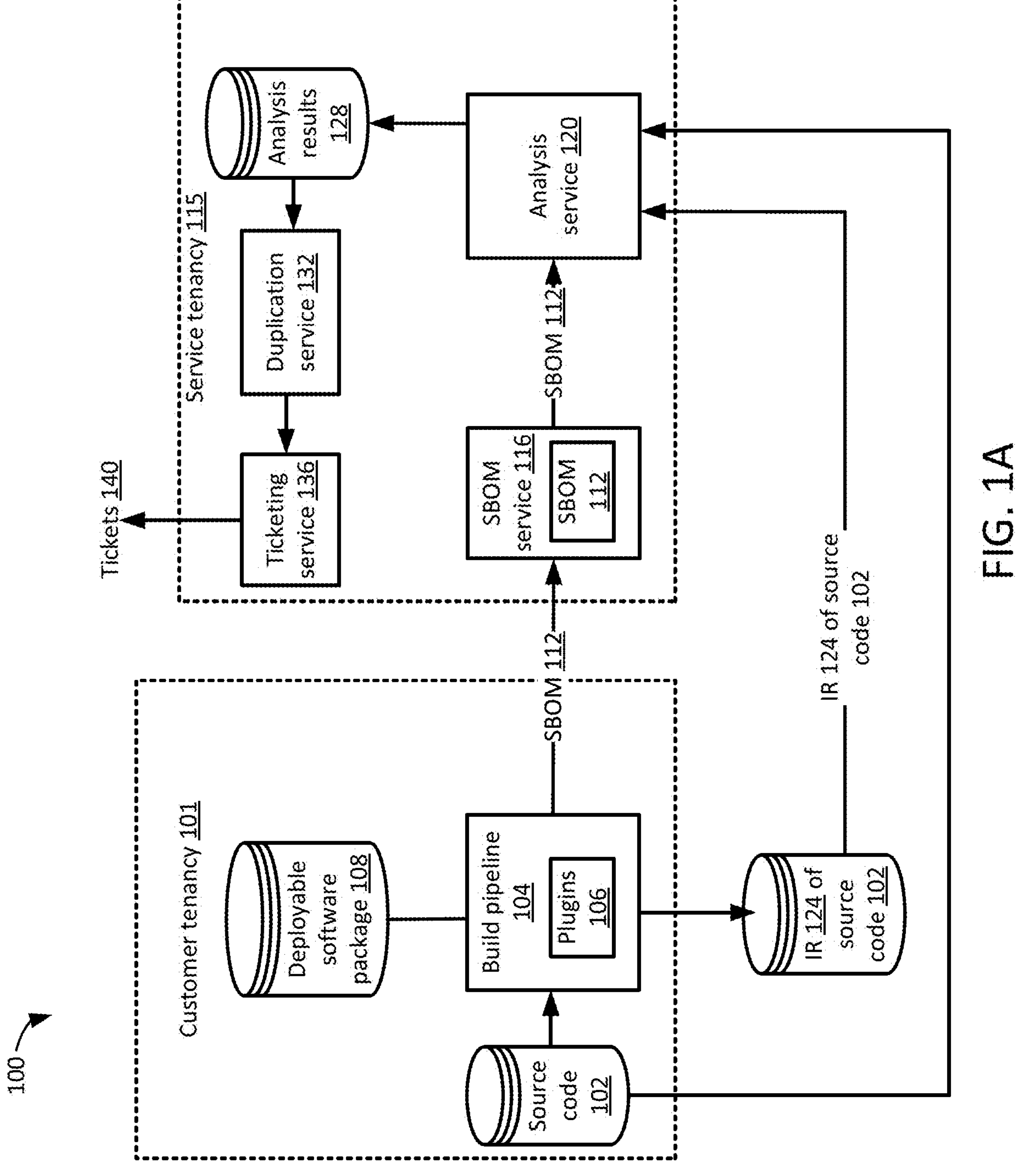
FIG. 1A illustrates a block diagram of a cloud environment comprising a service tenancy that includes a plurality of services for reviewing and analyzing a software package and/or associated source code.

Maintaining security of a cloud environment involves controlling access to cloud resources within the cloud environment, based on permissions specified by respective cloud customers. A cloud customer can grant permissions for accessing cloud resources that it rents, but the cloud customer should not be able to grant permissions for accessing cloud resources rented by other customers. A tenancy is a conceptual bucket that holds cloud resources belonging to a particular cloud customer. An administrator of a tenancy has administrative rights to set access policies for cloud resources in the tenancy; an administrator of a tenancy does not have administrative rights to set access policies for cloud resources in another tenancy. A tenancy of a cloud customer is isolated from another tenancy of another cloud customer.

In an example, the cloud customer deploys mobile applications (or mobile apps) to mobile computing devices of end users. The cloud customer also operates a corresponding cloud application on a cloud-based server, where the cloud application provides service to the mobile applications. The mobile applications from the end user devices communicate with the corresponding cloud application hosted by the cloud customer within a cloud customer tenancy.

In a typical scenario, a cloud customer renting a tenancy may develop source code, test, build, and package the source code as a deployable software package, and may deploy the deployable software package. The source code may be for the mobile application to be deployed to a plurality of end user devices, or the source code may be for the cloud application to be deployed to a cloud-based server. In an example, the cloud customer may develop source code, test, build, package, and deploy the source code without significant intervention, monitoring, and/or control from a provider of the cloud environment or from another third party. However, in the cloud environment described herein, in the context of software assurance of the mobile application, in an example, an assurance administrator may additionally be involved. The assurance administrator may or may not be the same as a cloud provider that owns the cloud environment. In an example, the assurance administrator acts as a "trusted technology provider" (TTP). It is assumed herein that the assurance administrator is the same as the cloud provider (the provider or owner of the cloud environment), although the teachings of this disclosure are not limited by such assumptions, and the assurance administrator may be different from the cloud provider.

In an example, the assurance administrator (which may or may not be the cloud provider) may have a monitoring role or some degree of control over the development and/or deployment of the source code. For example, the assurance administrator may want to ensure that the source code corresponding to the mobile application or the cloud application adheres to certain security related standards. For example, the assurance administrator may want to ensure that the mobile application transmits user data to the cloud environment, and not to any unauthorized third party. To ensure that the source code deployed by the cloud customer to various end user devices (or to the cloud-based server) meets security standards set by the assurance administrator, in an example, the assurance administrator may perform security analysis or software assurance analysis of the software package of the source code developed by the cloud customer.

As a part of such software assurance, the assurance administrator may want to review and analyze (i) the source code and/or (ii) the deployable software package that is built from the source code. Detected security risks, vulnerabilities, anomalies, and/or any other critical issues within the source code and/or the deployable software package may be reported back to the assurance administrator. The assurance administrator processes such reports, and may negotiate with the cloud customer to fix the detected issues. In an example, if the detected security risks, vulnerabilities, anomalies, and/or any other issues indicate significant security risks, the assurance administrator may escalate the report, and in extreme cases, may even report the issues to a higher reporting authority (such as a government regulatory agency). Software assurance actions taken by the assurance administrator may be implementation specific, and may vary from one implementation to the next.

In an example, the assurance administrator may not immediately want to share with the cloud customer the actual analysis data gathered by the assurance administrator, and may want to maintain "confidentiality of analysis" of the analysis data for at least a short period of time. On the other hand, the cloud customer may want to maintain confidentiality of the source code of the mobile application, as the source code is developed by the cloud customer, and is the intellectual property of the cloud customer. This is referred to as the cloud customer's desire to maintain "confidentiality of the source code."

There may be some degree of mutual distrust between the assurance administrator and the cloud customer. For example, once the assurance administrator has reviewed, analyzed, and approved source code and an associated software package of the mobile application (or cloud application) developed by the cloud customer, the assurance administrator may want to ensure that only the approved software package (and not any other software packages that have not been approved by the assurance administrator) are deployed by the cloud customer. Accordingly, a software package developed by the cloud customer and approved by the assurance administrator is allowed to pass to a deployment tenancy for deployment, e.g., only after the assurance administrator has verified that the approved software package (and not any revised version of the approved software package, or an altogether new software package) is being passed to the deployment tenancy, as will be described below.

In an example, a build pipeline (e.g., which is developed and maintained by the cloud customer) builds a software package from source code that is also developed by the cloud customer. In an example, the build pipeline may be executed within a customer tenancy rented out to the cloud customer. The build pipeline receives the source code for the mobile application, and generates a deployable software package. For example, the build pipeline compiles the source code, links various components and libraries of the source code, and/or performs one or more other tasks, such as tests and packages the source code, to generate the deployable software package. The deployable software package includes the compiled and packaged binary version of the source code.

In an example, the build pipeline includes one or more build plugins that are developed by the assurance administrator (or developed jointly by the assurance administrator and the cloud customer). When (or subsequent to) the build pipeline builds the deployable software package, the build plugins generate a build manifest, which is a software bill of material (SBOM) of the deployable software package. Thus, the SBOM uniquely identifies the deployable software package. The SBOM is a formal record comprising the details and supply chain relationships of various components and libraries within of the deployable software package, and may include metadata associated with the deployable software package. In an example, the SBOM includes identifications of one or more software components, libraries, etc. of the deployable software package, and/or includes hash values of one or more built components of the deployable software package.

The SBOM is uniquely tied to the deployable software package. Thus, once the SBOM is generated for the deployable software package, any change in the deployable software package can be detected using the SBOM. For example, after the SBOM has been generated for the deployable software package, any revision to the deployable software package would result in a mismatch or non-correspondence between the SBOM and the revised deployable software package.

In an example, an intermediate representation (IR) of the source code is also generated (e.g., by the one or more build plugins), and stored in a storage repository. The IR is a data structure or code used internally by a compiler or a virtual machine to represent the source code, as described below in further detail. In an example, the IR is a representation of the source code, where the IR is suitable for security vulnerability analysis of the source code.

The cloud environment also includes a service tenancy that is controlled, maintained, and/or accessed by the assurance administrator. For example, one or more services within the service tenancy are developed and/or operated by personnel of the assurance administrator.

A SBOM service within the service tenancy communicates with the build plugins of the build pipeline, and receives the SBOM from the build plugins. An analysis service within the service tenancy performs analysis of the source code. For example, the analysis service receives one or more of (i) the SBOM, (ii) the IR of the source code, and/or (iii) at least sections of the source code. Based on the SBOM, the IR, and/or at least the sections of the source code, the analysis service analyzes the source code, e.g., to detect security risks, vulnerabilities, anomalies, and/or any other critical issues within the source code. Different types of analyses may be performed by the analysis service, examples of which are described below in further detail. In an example, the IR may be analyzed in a tenancy, over which the cloud customer has some degree of control or monitoring role (e.g., see FIG. 1B).

In an example, analysis results are stored within a storage repository that is either within the service tenancy, or external to the service tenancy but accessible by the service tenancy. The analysis results are processed by a duplication service that aims to avoid reporting duplicate analysis results for different versions or revisions of the source code. A ticketing service within the service tenancy reviews the analysis results, and issues tickets to keep track of any security risks, vulnerabilities, anomalies, and/or other issues that may be detected. Each ticket may be reviewed (e.g., by a machine learning model and/or by personnel of the assurance administrator) and analyzed. In an example, personnel of the assurance administrator may processes the analysis results and the tickets, and may negotiate and communicate with the cloud customer to fix the detected security risks, vulnerabilities, anomalies, and/or other issues. For example, the cloud customer revises the source code, to fix any such issues. This process may be iteratively repeated, e.g., (i) analysis of a version of the source code, (ii) detection of one or more vulnerabilities, (iii) resolving the vulnerabilities by revising the source code and generating a new version of the source code, (iv) analysis of the new version of the source code, and so on. This iterative process may be repeated, until the analysis service does not detect any critical security risks, vulnerabilities, anomalies, and/or other critical issues within the current version of the source code. At this time, there are no critical reportable issues within the current version of the source code, and the current version of the source code has successfully passed the analysis.

Upon successful completion or passing of the analysis (e.g., when no critical security risks, vulnerabilities, anomalies, and/or other issues are detected within the current version of the source code), the assurance administrator is satisfied with and approves the source code and the associated deployable software package. For example, the assurance administrator is willing to allow passage of the deployable software package towards deployment (e.g., to a plurality of devices of end users of the mobile application, or to a cloud-based server of the cloud application).

Note that in another example, (i) the allowance of passage of the deployable software package towards deployment and (ii) the completion or passing of the analysis may be asynchronous. For example, passage of the deployable software package towards deployment may be allowed prior to, during, or subsequent to the analysis on the deployable software package being performed. For example, only such a deployable software package, which is to be, or is being, or has been analyzed, is allowed passage towards deployment.

However, there may be some degree of mutual distrust between the cloud customer and the assurance administrator. For example, the assurance administrator may want to ensure that the cloud customer deploys the deployable software package (and not any other version or revision of the deployable software package), for which the assurance administrator has performed the analysis. Thus, the assurance administrator may want to ensure that the cloud customer does not perform any revision to the deployable software package, after the SBOM has been generated and the assurance administrator has performed the analysis of the corresponding source code. In an example, to ensure integrity of the deployable software package, upon successful completion of the analysis by the service tenancy, the SBOM is digitally signed by a signature service maintained by the assurance administrator. For example, the signature service receives the SBOM, as well as an indication that the analysis of the source code and the corresponding software package is successfully completed (or will be completed), and digitally signs the SBOM.

In an example, to deploy the deployable software package to the plurality of devices of the end user, the deployable software package has to pass to a deployment tenancy that is controlled and operated by the cloud customer. Access to the deployment tenancy may be through a gateway tenancy that is controlled and operated by the assurance administrator. However, deployable software packages being provided to the deployment tenancy have to pass through the gateway tenancy that is controlled by the assurance administrator. Thus, the assurance administrator is aware of, and has monitoring and controlling role over any deployable software package being transmitted to the deployment tenancy for deployment.

In an example, the gateway tenancy executes a verification service. The verification service receives the deployable software package that is generated by the build pipeline and that is to be transmitted to the deployment tenancy through the gateway tenancy. The verification service also receives the signed SBOM. The verification service initially ensures that the signature of the signed SBOM is valid. Once the signature of the signed SBOM is validated by the verification service, the verification service now ensures that the deployable software package (which is asking for passage to the deployment tenancy) matches with the signed SBOM.

For example, the verification service ensures that the signed SBOM is specifically for the deployable software package.

For example, if the cloud customer inadvertently, intentionally (e.g., for testing purposes or other reasons), or maliciously revised the source code and/or the deployable software package subsequent to the generation of the SBOM, the SBOM (and hence the signed SBOM) will not match with the deployable software package. Accordingly, the verification service will detect such a mismatch between the signed SBOM and the deployable software package received by the verification service, and will reject the deployable software package, e.g., not allow passage of the deployable software package to the deployment tenancy.

However, if the deployable software package has not been revised subsequent to the generation of the SBOM, the SBOM (and hence the signed SBOM) will match or correspond with the deployable software package. Accordingly, the verification service will detect a match between the signed SBOM and the deployable software package received by the verification service, and will allows passage of the deployable software package from the customer tenancy to the deployment tenancy.

Once the gateway tenancy allows passage of the deployable software package to the deployment tenancy, the deployable software package is then deployed from the deployment tenancy to (i) a plurality of devices of the end users (e.g., through an application store, or by bypassing any application store), or (ii) a cloud-based server, as described in detail herein below.

Selective passage of the deployable software package, after verification and matching with a corresponding signed SBOM, prevents or reduces possibilities of any tampering or revisions of the software package to be deployed, after the deployable software package is provided to an analysis service for analysis by the assurance administrator. Thus, only those software packages, which have been (or will be) reviewed and analyzed by the assurance administrator, and for which the corresponding SBOMs have been signed, are allowed passage to the deployment tenancy. This prevents, or reduces possibilities of malicious software packages (or those software packages that have not been reviewed and approved by the service tenancy) being transmitted to the deployment tenancy for deployment, as described below in further detail.

Figure 1B:
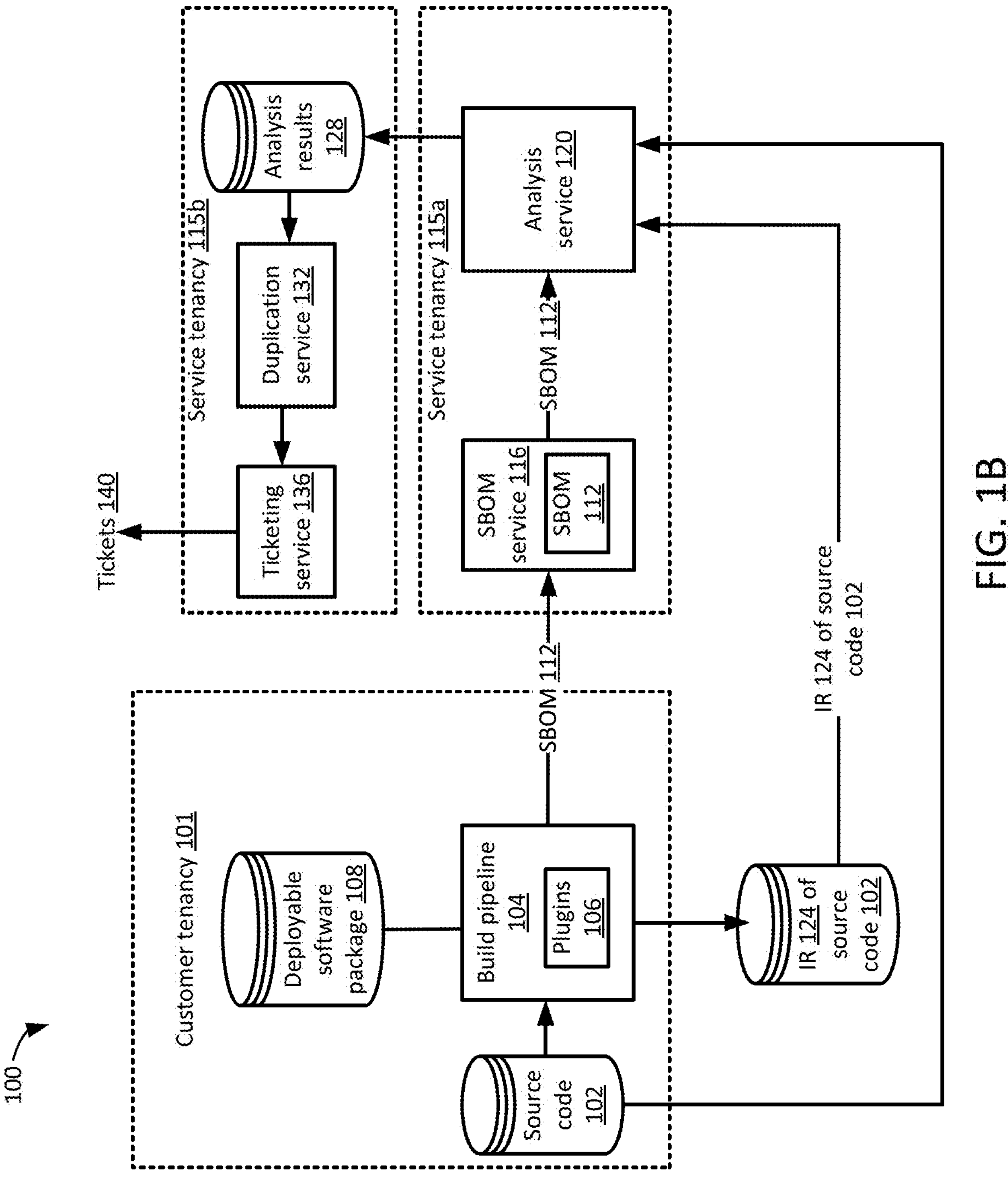
FIG. 1B illustrates another block diagram of a cloud environment comprising one or more service tenancies that include a plurality of services for reviewing and analyzing a software package and/or associated source code.

FIG. 1A illustrates a block diagram of a cloud environment 100 comprising a service tenancy 115 that includes a plurality of services for reviewing and analyzing a deployable software package 108 and/or associated source code 102.

The cloud environment 100 includes a customer tenancy 101. In an example, the customer tenancy 101 is rented to a cloud customer, and is also referred to herein as a cloud customer tenancy. Thus, the cloud customer utilizes cloud resources of the customer tenancy 101.

A repository within the cloud environment 100 stores source code 102. The repository storing the source code 102 may be within the customer tenancy 101 (as illustrated in FIG. 1A), or may be external to (and be accessible to) the customer tenancy 101.

In an example, the cloud customer deploys a mobile application (or a mobile app) to mobile computing devices of end users. The mobile application communicates with a corresponding cloud application hosted by the cloud customer within a cloud customer tenancy (which may be same as, or different from the customer tenancy 101). The source code 102 is for the mobile application to be deployed to the mobile computing devices of end users. In an example, the cloud customer renting the customer tenancy 101 develops the source code 102.

In another example, the source code 102 may be for a software for deployment on the server side. For example, the software corresponding to the source code 102 is a cloud application for deployment on a cloud-based server, and the cloud application interacts with and provides service to a plurality of mobile applications deployed within a plurality of end user mobile devices.

Thus, the source code 102 may be for any software application, such as a mobile application being deployed to end user mobile devices, or server-side cloud application being deployed to one or more servers.

In an example, the customer tenancy 101 includes a build pipeline 104. In an example, the cloud customer develops and operates the build pipeline 104 (although in another example the assurance administrator may have some or full role, or may monitor the development and operation of the build pipeline 104). The role of the cloud customer and/or the assurance administrator in developing and/or operating the build pipeline 104 may be implementation specific, and/or may depend on the type of the source code 102. Merely as an example, if the source code 102 corresponds to a mobile application to be deployed in end user mobile devices, the cloud customer may have a greater role in developing and/or operating the build pipeline 104; and if the source code 102 corresponds to a cloud application to be deployed in cloud-based servers, the assurance administrator may have a different (e.g., lesser) role in developing and/or operating the build pipeline 104, and such roles may change from one implementation to the next. The build pipeline 104 receives the source code 102, and generates a deployable software package 108. For example, the build pipeline 104 compiles the source code 102, links various components and libraries of the source code 102, and/or performs one or more other tasks, such as tests and packages the source code 102, to generate the deployable software package 108. The software package 108 is referred to as being deployable, as the software package 108 is compiled and packaged for deployment (e.g., to a plurality of devices of the end users, or to a cloud-based server, as described above). The deployable software package 108 includes the compiled and packaged binary version of the source code 102. The deployable software package 108 may be stored within a storage repository that is within the customer tenancy 101 (as illustrated in FIG. 1A) or is accessible to the customer tenancy 101.

In the context of software assurance of the mobile application corresponding to the deployable software package 108, in an example, an assurance administrator may additionally be involved. The assurance administrator may or may not be the same as a cloud provider that owns the cloud environment 100. It is assumed herein that the assurance administrator is the same as the cloud provider (the provider or owner of the cloud environment), although the teachings of this disclosure are not limited by such assumptions, and the assurance administrator may be different from the cloud provider. In an example, the assurance administrator (which may be the cloud provider in an example) may have a monitoring role or some degree of control over the development and/or deployment of the deployable software package 108. For example, the assurance administrator may want to ensure that the software application corresponding to the deployable software package 108 adheres to certain security related standards. For example, the assurance administrator may want to ensure that the software application restricts user data within the cloud environment 100, and does not transmit such user data to any unauthorized third party. To ensure that the deployable software package 108 meets security standards set by the assurance administrator, in an example, the assurance administrator may perform security analysis or software assurance analysis of the source code 102 and/or the deployable software package 108 developed by the cloud customer.

To facilitate the software assurance tasks of the assurance administrator, the build pipeline 104 includes one or more build plugins 106. The build plugins 106 may be developed by the assurance administrator, or may be developed jointly by the assurance administrator and the cloud customer. In any case, the build plugins 106 are included within or associated with the build pipeline 104.

While the build pipeline 104 builds the deployable software package 108, the build plugins 106 generate a build manifest 112, which is a software bill of material (SBOM) 112 of the deployable software package 108. Thus, the SBOM 112 uniquely identifies the deployable software package 108. The SBOM 112 is a formal record comprising the details and supply chain relationships of various components and libraries within of the deployable software package 108. For example, the SBOM 112 includes metadata associated with the deployable software package 108. In an example, the SBOM 112 includes identifications of one or more software components, libraries, etc. of the deployable software package 108. In an example, the SBOM 112 includes hash values of one or more built components of the deployable software package 108.

The SBOM 112 is uniquely tied to the deployable software package 108. Thus, once the SBOM 112 is generated for the deployable software package 108, any change in the deployable software package 108 can be detected using the SBOM 112. For example, assume that the SBOM 112 is generated for an original version of the deployable software package 108. Now, assume that the deployable software package 108 is modified, to generate a revised version of the deployable software package 108. Accordingly, because of the revisions in the deployable software package 108 after generation of the SBOM 112, the SBOM 112 would no longer correspond to (e.g., no longer be a match with) the revised version of the deployable software package 108. For example, by analyzing the SBOM 112 and the revised version of the deployable software package 108, it can be inferred that the SBOM 112 was not generated for the revised version of the deployable software package 108 (because the SBOM 112 was generated for the original version of the deployable software package 108). In an example, the SBOM 112 may be transmitted by the plugins 106 to the service tenancy 115, as will be described below in detail.

In an example, an intermediate representation (IR) 124 of the source code 102 is also generated (e.g., by the one or more build plugins 106), and stored in a storage repository. The storage repository storing the IR 124 of the source code 102 may be external (or internal) to the customer tenancy 101, and/or may be external (or internal) to the service tenancy 115. The IR 124 is the data structure or code used internally by a compiler or a virtual machine to represent the source code 102. The IR 124 may be designed to be conducive to further processing, such as optimization, analyzing, and/or translation of the source code 102. In an example, the IR 124 may represent the source code 102 is a different form, without substantial loss of information. In an example, the IR 124 is a representation of the source code 102, where the representation is suitable for security vulnerability analysis. In an example, the IR 124 may take one of several forms, such as an in-memory data structure, a special tuple or stack-based code, in the form of an intermediate language, and/or the like. Merely as an example, a CPython interpreter transforms a linear human-readable text representing a program into an intermediate graph structure that allows flow analysis of the program.

The cloud environment 100 also includes the service tenancy 115. In an example, the service tenancy 115 is controlled, maintained, and/or accessed by the assurance administrator. For example, one or more services within the service tenancy 115 are developed and/or operated by personnel of the assurance administrator. In an example where the assurance administrator is same as the cloud provider, the service tenancy 115 is controlled, maintained, and/or accessed by personnel of the cloud provider.

A SBOM service 116 within the service tenancy 115 communicates with the build plugins 106, and receives the SBOM 112 from the build plugins 106. The SBOM 112 may be stored within a storage repository within the service tenancy 115, or outside the service tenancy 115 and accessible from the service tenancy 115.

An analysis service 120 within the service tenancy 115 performs analysis of the source code 102. For example, the analysis service 120 receives the SBOM 112 from the SBOM service 116, and/or receives the IR 124 of the source code 102. In an example, the analysis service 120 receives may also receive the source code 102, or at least sections of the source code 102. Based on the SBOM 112, the IR 124, and/or at least sections of the source code 102, the analysis service 120 analyzes the source code 102, e.g., to detect security risks, vulnerabilities, anomalies, and/or any other critical issues within the source code 102.

Note that in an example, the analysis is performed based on the SBOM service 116 and/or the IR 124, without the analysis service 120 receiving the source code 102. Accordingly, in such an example, the analysis service 120 does not have access to the actual source code 102, and rather has access to the IR 124. Accordingly, the above described "confidentiality of the source code" is maintained. Thus, the assurance administrator, who maintains the service tenancy 115 and the analysis service 120, may not have access to the source code 102.

In another example, only sections of the source code 102 (and not the entire source code 102) may be accessible to the analysis service 120. Accordingly, in this case as well, the confidentiality of the source code 102 is maintained. In an example, one or more personnel employed by or representing the assurance administrator (or a neutral third party who is affiliated with neither the cloud customer nor the assurance administrator) does a manual review of the source code 102, and may exfiltrate only relevant sections of the source code 102 to the analysis service 120. For example, one or more sections of the source code 102 (but not necessarily the entire source code 102), which the personnel doubt may have security risks, vulnerabilities, anomalies, and/or other critical issues, are passed to the analysis service 120. Accordingly, the above-described confidentiality of the source code is also maintained in such a scenario.

Different types of analyses may be performed by the analysis service 120. In an example, automated tools may be used to analyze artifacts and meta information from the SBOM 112 and/or the IR 124. Different types of analysis tooling may be executed to determine whether there are security risks, vulnerabilities, anomalies, and/or other issues that might lead to opportunities for the mobile application associated with the deployable software package 108 to be exploited in such a way that user data from the mobile application is transmitted to a third party outside the cloud environment 100. Thus, possibilities of data leakage (e.g., once the deployable software package 108 is deployed in the mobile devices of the end users) are analyzed. In an example, static analysis may be executed using compositional analysis, so as to examine different components of the software package 108. The available information is examined for possible one or more known types of vulnerabilities, such the injection vulnerabilities, buffer overflows, etc. In an example, manual analysis may also be performed, e.g., by one or more programmers and testers. Teachings of this disclosure is not limited to any specific type of analysis performed.

In an example, analysis results 128 are stored within a storage repository that is either within the service tenancy 115, or external to the service tenancy 115 but accessible by the service tenancy 115. The analysis results 128 are processed by a duplication service 132 that aims to avoid reporting duplicate analysis results. For example, a baseline scoring is maintained by the duplication service 132, so as to avoid ticketing duplicative issues in the source code 102. For example, various update and revisions to the source code 102 may be possible. A same issue may be present in multiple versions of the source code 102, and the same issue in such multiple versions may be linked together. Thus, the same issue in multiple versions of the source code 102 is grouped together, such that they are reported in unison.

In an example, a ticketing service 136 may be implemented within the service tenancy 115. The ticketing service 136 reviews the analysis results 128, and issues tickets 140 to keep track of any security risks, vulnerabilities, anomalies, and/or other issues that may be detected. Each ticket 140 may track a corresponding issue detected by the analysis service 120.

Although not illustrated in FIG. 1A, each ticket 140 may be reviewed (e.g., by a machine learning model and/or by a human) and analyzed. For example, the tickets 140 may be reviewed and analyzed by one or more personnel associated with the assurance administrator. The cloud customer may not have direct access to the tickets 140, unless shared with the cloud customer by the assurance administrator. Thus, the "confidentiality of analysis" objective of the assurance administrator is maintained.

In an example, to resolve the tickets 140, personnel of the assurance administrator may communicate with the cloud customer. The assurance administrator may processes the analysis results 128, and may negotiate and communicate with the cloud customer to fix the detected security risks, vulnerabilities, anomalies, and/or other issues. In an example, if the security risks, vulnerabilities, anomalies, and/or other issues indicate significant security risks, the assurance administrator may escalate the corresponding tickets, and in extreme cases, may even report the security risks, vulnerabilities, anomalies, and/or other issues to a higher reporting authority (such as a government regulatory agency). Software assurance actions taken by the assurance administrator may be implementation specific, and may vary from one implementation to the next.

Thus, for a ticket indicating a security risk, vulnerability, anomaly, and/or another issue, the assurance administrator may communicate with the cloud customer to fix the source code 102, and generate a new version of the source code. This process may be iteratively repeated, e.g., (i) analysis of a version of the source code 102, (ii) detection of one or more vulnerabilities, (iii) resolving the vulnerabilities by revising the source code 102 and generating a new version of the source code 102, (iv) analysis of the new version of the source code 102, and so on.

This iterative process is repeated, until the analysis service 120 does not detect any critical security risks, vulnerabilities, anomalies, and/or other critical issues within the current version of the source code 102. At this time, there are no critical reportable issues within the current version of the source code 102, and the current version of the source code 102 has successfully passed the analysis.

Note that in FIG. 1A, a single service tenancy 115 is illustrated. In contrast, in FIG. 1B, the service tenancy 115 of FIG. 1A is divided in two or more tenancies 115*a*, 115*b*. For example, the IR 124 is a representation of the source code 102, and the source code 102 is an intellectual property of the cloud customer (e.g., as the source code 102 is developed by the cloud customer). Accordingly, the cloud customer may prefer to have some degree of control or monitoring over the IR 124. Accordingly, in an example, the analysis of the IR 124 is performed within a restricted or controlled environment of the service tenancy 115*a* of FIG. 1B. In an example, the service tenancy 115*a* may be jointly operated by the cloud customer and the assurance administrator. In another example, the service tenancy 115*a* may be owned and/or operated by the assurance administrator, but with restrictions and/or monitoring imposed by the cloud customer. Thus, the cloud customer may have some degree of control and/or monitoring role on the service tenancy 115*a*. This may in turn facilitate the cloud customer ensuring that the IR 124 is used for purposes of security vulnerability analysis, and not for any other purpose. Additionally or alternatively, such control and/or monitoring role may also eliminate or at least reduce possibility of leakage of the IR code from the service tenancy 115*a*, in an example.

Figure 2:
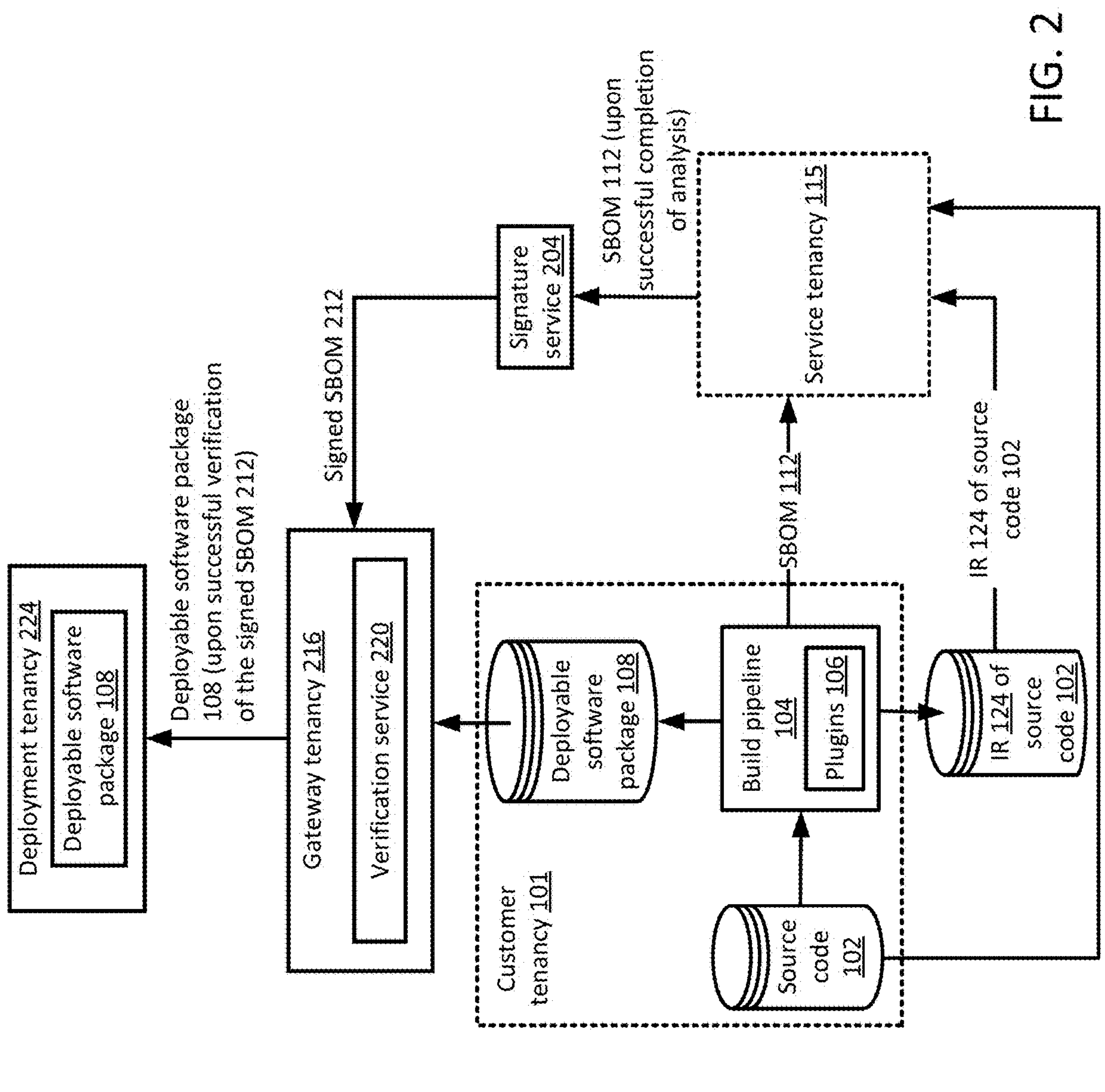
FIG. 2 illustrates a block diagram of a cloud environment in which a deployable software package is selectively allowed passage to a deployment tenancy, upon verification of a signature of a signed software bill of materials (SBOM) associated with the deployable software package.

FIG. 2 illustrates a block diagram of a cloud environment 200 in which a deployable software package 108 is selectively allowed passage to a deployment tenancy 224, upon verification of a signature of a signed SBOM 212 associated with the deployable software package 108.

The cloud environment 100 of FIG. 1A is a part of the cloud environment 200 of FIG. 2, and one or more components of the cloud environment 100 of FIG. 1A is also included within the cloud environment 200 of FIG. 2. For example, in the cloud environment 200 of FIG. 2, the build pipeline 104 builds the deployable software package 108 from the source code 102. The build plugins 106 generates the SBOM 112 and the IR 124 of the source code 102. The cloud environment 200 also includes the service tenancy 115 (although various components within the service tenancy 115, which are illustrated in FIG. 1A, are not illustrated again in FIG. 2 for purposes of illustrative clarity). Note that a single service tenancy 115 of FIG. 2 may be divided in two or more service tenancies 115*a*, 115*b*, as described above with respect to FIG. 1B. The analysis service 120 within the service tenancy 115 analyzes the SBOM 112, the IR 124, and/or one or more sections of the source code 102, and generates analysis results 128. The ticketing service 136 within the service tenancy 115 generates corresponding tickets 140. Upon successful completion or passing of the analysis (e.g., when no critical security risks, vulnerabilities, anomalies, and/or other issues are detected within the current version of the source code 102), the assurance administrator is satisfied with the source code 102. For example, the assurance administrator is willing to allow passage of the deployable software package 108 towards deployment to a plurality of devices of end users of the mobile application (e.g., if the software package 108 is a mobile application) or towards deployment in a cloud-based server (e.g., if the software package 108 is a cloud application), a described above.

However, as described above, there may be some degree of mutual distrust between the cloud customer and the assurance administrator. For example, the assurance administrator may want to ensure that the cloud customer deploys the deployable software package 108 (and not any other versions or revisions of the deployable software package 108), for which the assurance administrator has performed the analysis. Furthermore, the assurance administrator may want to ensure that the cloud customer does not perform any revision to the deployable software package 108, after the SBOM 112 has been generated and the assurance administrator has performed the analysis of the corresponding source code 102.

In an example, to ensure integrity of the deployable software package 108 (e.g., to ensure that the deployable software package 108 has not been revised or changed), the SBOM 112 is digitally signed. For example, referring again to FIG. 2, upon successful completion of the analysis by the service tenancy 115 (e.g., after there are no outstanding tickets 140 indicating critical security risks, vulnerabilities, anomalies, and/or other issues), the SBOM 112 is digitally signed by a signature service 204.

The signature service 204 may be operated by the assurance administrator. The signature service 204 may be executed from within the service tenancy 115, or from within another tenancy that is controlled by the assurance administrator. The signature service 204 receives the SBOM 112, as well as an indication that the analysis of the source code 102 and the corresponding software package 108 is successfully completed. For example, the tenancy 115 (such as the ticketing service 136 and/or the analysis service 120) provides an indication that the source code 102 and the software package 108 have passed the analysis. Responsive to the indication that the source code 102 and the software package 108 have passed the analysis, the signature service 204 digitally signs the SBOM 112, to generate a signed SBOM 212, as illustrated in FIG. 2. The signature service 204 digitally signs the SBOM 112, as an indication of an approval by the assurance administrator of the associated deployable software package 108.

In an example, to deploy the deployable software package 108, the deployable software package 108 has to pass to a deployment tenancy 224. Access to the deployment tenancy 224 may be through a gateway tenancy 216. Note that although the gateway tenancy 216 is illustrated to be separate from the service tenancy 115 and a verification service 204, in an example, one or more components within the service tenancy 115 and/or the verification service 204 may be included within the gateway tenancy 216. In another example, instead of implementing a dedicated or standalone gateway tenancy 216, the verification service 220 may operate from another tenancy, such as the service tenancy 115 and/or another tenancy that is under control of the assurance administrator. Thus, although the gateway tenancy 216 and the service tenancy 115 are illustrated to be separate tenancies, the gateway tenancy 216 and the service tenancy 115 may be combined in a single tenancy in an example.

The deployment tenancy 224 may be controlled by the cloud customer. However, deployable software packages being provided to the deployment tenancy 224 have to pass through the gateway tenancy 216 that is controlled by the assurance administrator. Thus, the assurance administrator is aware of, and has monitoring and controlling role over any deployable software package being transmitted to the deployment tenancy 224 for deployment.

In an example, the gateway tenancy 216 (which is under the control of the assurance administrator) executes a verification service 220. The verification service 220 receives the deployable software package 108 generated by the build pipeline 104, where the deployable software package 108 is to be transmitted to the deployment tenancy 224 through the gateway tenancy 216. The verification service 220 also receives the signed SBOM 212. The verification service 220 initially ensures that the signature of the signed SBOM 212 is valid. For example, the SBOM 112 is signed by the signature service 204 using a private key of a public-private key pair, and the verification service 220 has the corresponding public key to validate the signature.

Once the signature of the signed SBOM 212 is validated by the verification service 220, the verification service 220 now ensures that the deployable software package 108 (which is asking for passage to the deployment tenancy 224) matches with the signed SBOM 212. For example, the verification service 220 ensures that the signed SBOM 212 (which is a signed version of the SBOM 112) is specifically and uniquely for the deployable software package 108 (e.g., the signed SBOM 212 matches the deployable software package 108).

For example, if the cloud customer inadvertently, intentionally (e.g., for testing purposes or other reasons), or maliciously revised the source code 102 and/or the deployable software package 108 subsequent to the generation of the SBOM 112, the SBOM 112 (and hence the signed SBOM 212) will not match with the deployable software package 108. Accordingly, the verification service 220 will detect such a mismatch between the signed SBOM 212 and the deployable software package 108 received by the verification service 220. This implies that the analysis service 120 performed analysis on an older version of the source code 102 and the deployable software package 108, whereas the cloud customer is trying to deploy a revised or different version of the deployable software package 108 generated from a corresponding revised version of the source code 102. In such a scenario, the verification service 220 will reject the deployable software package 108, e.g., not allow (or fail to allow) passage of the deployable software package 108 from the customer tenancy 101 to the deployment tenancy 224.

However, if the deployable software package 108 has not been revised subsequent to the generation of the SBOM 112, the SBOM 112 (and hence the signed SBOM 212) will match or correspond with the deployable software package 108. Accordingly, the verification service 220 will detect a match between the signed SBOM 212 and the deployable software package 108 received by the verification service 220. This implies that the analysis service 120 performed analysis on the same version of the source code 102 and the deployable software package 108, which is now to be passed to the deployment tenancy 224. Accordingly, the verification service 220 will allows passage of the deployable software package 108 from the customer tenancy 101 to the deployment tenancy 224.

Once the gateway tenancy 216 (such as the verification service 220) allows passage of the deployable software package 108 to the deployment tenancy 224, the deployable software package 108 is stored within the deployment tenancy 224. The deployable software package 108 is then deployed from the deployment tenancy 224 to a plurality of devices of the end users or to a cloud-based server, as described above. In an example where the software package 108 is a mobile application to be deployed to devices of the end users, the deployable software package 108 may be transmitted from the deployment tenancy 224 to one or more application stores, such as the Google Play Store® or the Apple App Store®, from which the deployable software package 108 may eventually be deployed to the end user devices. In another example, deployable software package 108 may be transmitted directly from the deployment tenancy 224 to the end user devices, e.g., bypassing any application store. The teaching of this disclosure is not restricted to manners in which the deployable software package 108 is deployed from the deployment tenancy 224.

Figure 3:
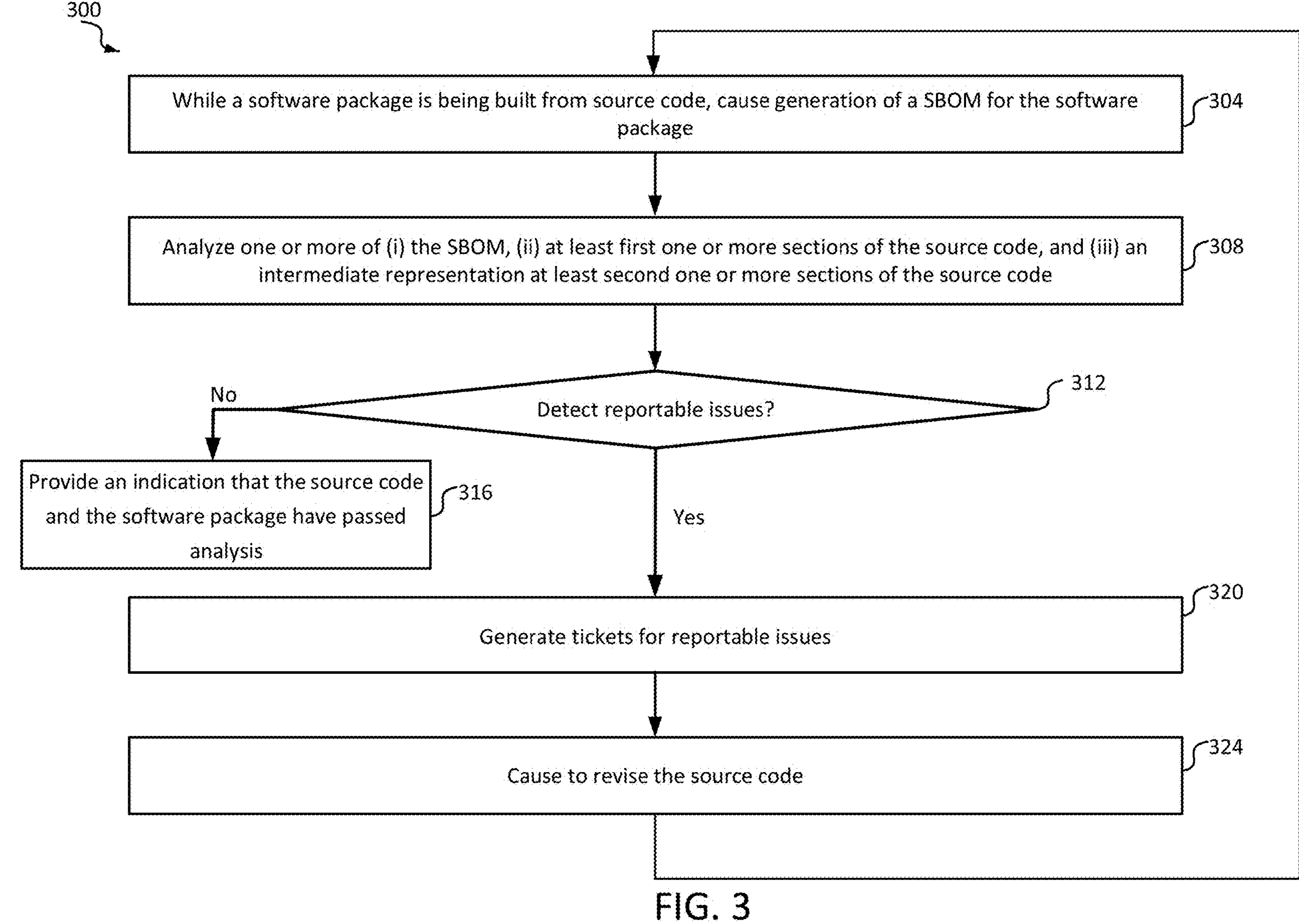
FIG. 3 is a flow diagram depicting a method for reviewing and analyzing a software package and/or associated source code.

FIG. 3 is a flow diagram depicting a method 300 for reviewing and analyzing a software package and/or associated source code. The method 300 may be executed, for example, by any of the cloud environments 100 and/or 200 of FIGS. 1A, 1B, and 2.

The method 300 includes, at 304, while (or subsequent to) a software package is being built from source code, causing generation of a SBOM for the software package. For example, when the build pipeline 104 builds the software package 108 from the source code 102, the build plugins 106 generate the SBOM 112 for the software package 108. In an example, the build plugins 106 are developed by the assurance administrator, and plugged in the build pipeline 104 that is operated by the cloud customer. Thus, plugging the build plugins 106 in the build pipeline 104 or operating the build plugins 106 cause generation of the SBOM 112 for the software package 108, for example, when the build pipeline 104 is building (or has completed building) the software package 108.

The method 300 proceeds from 304 to 308. At 308, one or more of (i) the SBOM, (ii) at least first one or more sections of the source code, and (iii) an intermediate representation at least second one or more sections of the source code are analyzed, e.g., by the analysis service 120.

The method 300 proceeds from 308 to 312. At 312, a determination is made as to whether any reportable issues are detected, based on the analysis. For example, the analysis results 128 may, or may not, include any issues, such as security risks, vulnerabilities, anomalies, and/or other reportable issues with the source code 102.

If "No" at 312 (e.g., if no reportable issues are detected at 312), the method 300 proceeds from 312 to 316, where the analysis of the source code 102 and the corresponding software package 108 is successfully completed. For example, the tenancy 115 (such as the ticketing service 136 and/or the analysis service 120) provides an indication that the source code 102 and the software package 108 have successfully passed the analysis.

If "Yes" at 312 (e.g., if reportable issues are detected at 312), the method 300 proceeds from 312 to 320, where tickets are generated for the reportable issues. For example, the ticketing service 136 generates tickets 140 indicating one or more reportable issues.

The method 300 proceeds from 320 to 324. At 324, the source code is caused to be revised. For example, the source code are revised by the cloud customer, e.g., to fix the reportable issues indicated by the tickets. Thus, the tickets 140 indicating the one or more reportable issues causes the source code to be revised. In an example, the assurance administrator and the cloud customer communicate and discuss the tickets 140 indicating the one or more reportable issues, and the cloud customer revises the source code accordingly.

The method 300 proceeds in a loop, where the method 300 proceeds from 324 to 304, where the revised source code of 324 is now used in the process 304 to build a revised software package. In an example, the method 300 is executed in a loop where the source code is iteratively revised, until all the reportable issues are resolved, and the analysis successfully completes at 316.

Figure 4:
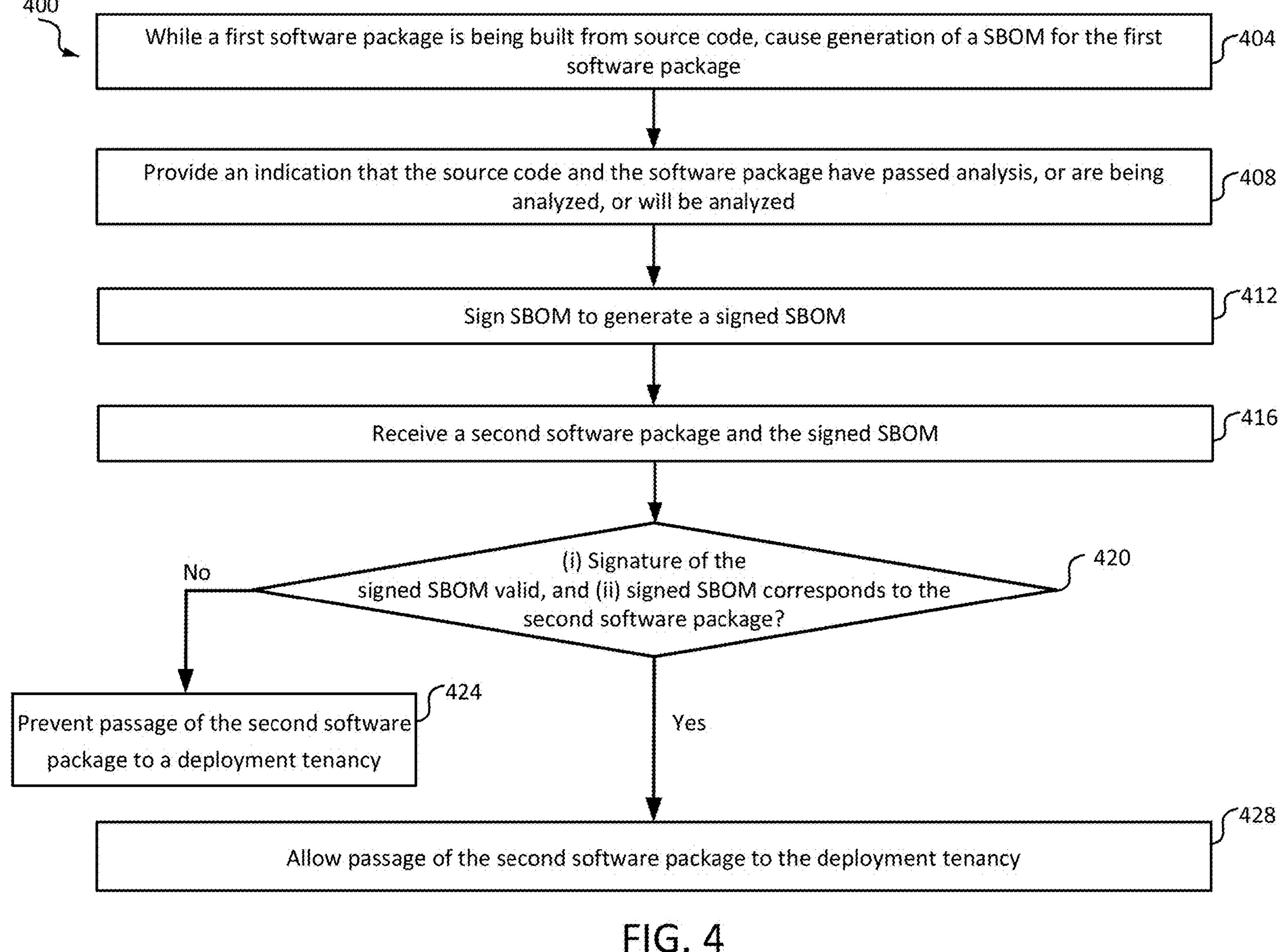
FIG. 4 is a flow diagram depicting a method for selectively allowing passage of a deployable software package to a deployment tenancy, based on a signed SBOM.

FIG. 4 is a flow diagram depicting a method 400 for selectively allowing passage of a deployable software package to a deployment tenancy, based on a signed SBOM. At 404 of the method 400, while (or subsequent to) a first software package is being built from source code, generation of a SBOM for the first software package is caused. The process 404 is similar to the process 304 described above with respect to the method 300 of FIG. 3.

The method 400 proceeds from 404 to 408. At 408, an indication is provided, indicating that the source code and the software package have at least one of (i) passed analysis, (ii) or are being analyzed, or (iii) will be analyzed. Thus, the analysis need not be complete at 408—rather, an assurance that the source code and the software package is due for analysis or are being analyzed may be sufficient. For example, the actual analysis may be performed asynchronously with respect to process 428 of method 400 described below. For example, the actual analysis may be performed prior to, or at least in part parallel with, or subsequent to, the process 428 of method 400 described below. Passing of the analysis at process 408 is similar to the process 316 described above with respect to the method 300 of FIG. 3. Thus, in an example, processes 404 and 408 of the method 400 may be performed at least in part based on the above description of the method 300 of FIG. 3.

The method 400 proceeds from 408 to 412. At 412, the SBOM is digitally signed, to generate a signed SBOM. For example, the signature service 204 signs the SBOM 112 to generate the signed SBOM 212, upon receiving an indication that the source code 102 and the deployable software package 108 have successfully passed the analysis by the analysis service 120, as described above.

The method 400 proceeds from 412 to 416. At 416, a second software package and the signed SBOM is received, where the second software package wants passage to a gateway tenancy. For example, the verification service 220 at the gateway tenancy 216 receives the second software package and the signed SBOM 212. At this point in the method 400, the verification service 220 is not aware whether the received second software package is same as the first software package. For example, as described above, the cloud customer may have inadvertently, intentionally (e.g., for testing purposes or other reasons), or maliciously revised the source code 102 and/or the deployable software package 108 subsequent to the generation of the SBOM 112—the verification service 220 is not aware as to whether such revision of the deployable software package 108 has occurred, or whether the first and second software packages are the same.

The method 400 proceeds from 416 to 420. At 420, a determination is made as to whether the signature of the signed SBOM is valid, and whether the signed SBOM corresponds to the second software package. For example, the verification service 220 initially validates the signature, to ensure that the signed SBOM is signed by the signature service 204. Subsequently, the verification service 220 determines whether the signed SBOM 212 is matching with the second software package received by the verification service 220, as also described above.

If the second software package and the first software package are the same (e.g., no revision to the first software package has been made subsequent to generation of the SBOM 112), then the signed SBOM 212 should match with the second software package received by the verification service 220.

If "No" at 420 (e.g., the signed SBOM does not correspond to the second software package), then the method 400 proceeds to 424, where the gateway tenancy 216 prevents passage of the second software package (or fails to pass the second software package) to a deployment tenancy.

On the other hand, if "Yes" at 420 (e.g., the signed SBOM corresponds to the second software package), then the method 400 proceeds to 428, where the gateway tenancy 216 allows passage of the second software package to the deployment tenancy. In an example, subsequent to process 428, the second software package (which is same as the first software package, which is the deployable software package 108) can be deployed from the deployment tenancy 224 to (i) a plurality of end user devices (e.g., through an application store, or bypassing any application store) or (ii) a cloud-based server, as described above.

Computer System Architecture

Figure 5:
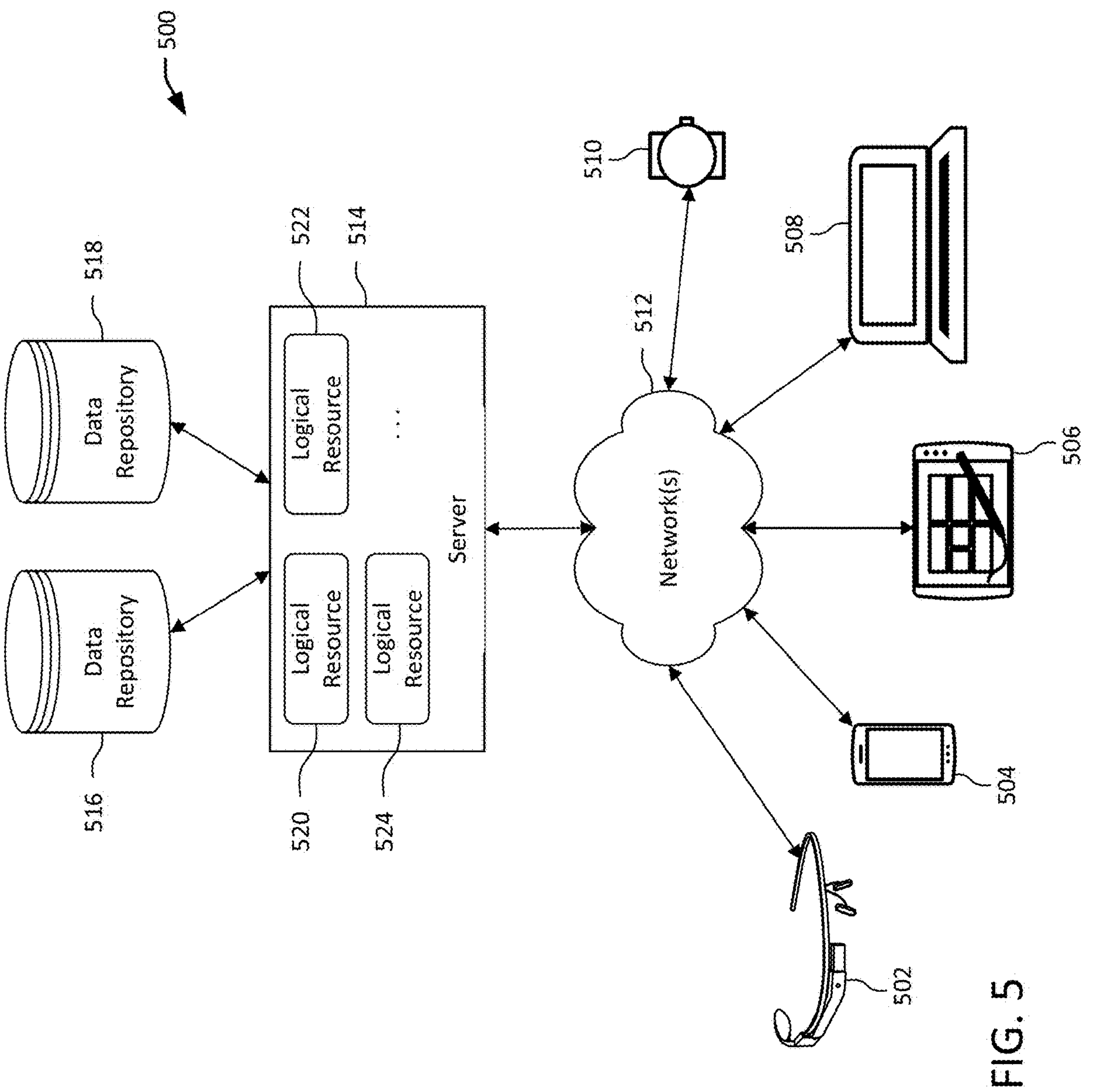
FIG. 5 depicts a simplified diagram of a distributed system for implementing certain aspects.

FIG. 5 depicts a simplified diagram of a distributed system 500 for implementing an embodiment. In the illustrated embodiment, distributed system 500 includes one or more client computing devices 502, 504, 506, 508, and/or 510 coupled to a server 514 via one or more communication networks 512. Clients computing devices 502, 504, 506, 508, and/or 510 may be configured to execute one or more applications.

In various aspects, server 514 may be adapted to run one or more services or software applications that enable techniques for selective passage of software packages (such as to a deployment tenancy), based on a signed SBOM.

In certain aspects, server 514 may also provide other services or software applications that can include non-virtual and virtual environments. In some aspects, these services may be offered as web-based or cloud services, such as under a Software as a Service (SaaS) model to the users of client computing devices 502, 504, 506, 508, and/or 510. Users operating client computing devices 502, 504, 506, 508, and/or 510 may in turn utilize one or more client applications to interact with server 514 to utilize the services provided by these components.

In the configuration depicted in FIG. 5, server 514 may include one or more components 520, 522 and 524 that implement the functions performed by server 514. These components may include software components that may be executed by one or more processors, hardware components, or combinations thereof. It should be appreciated that various different system configurations are possible, which may be different from distributed system 500. The embodiment shown in FIG. 5 is thus one example of a distributed system for implementing an embodiment system and is not intended to be limiting.

Users may use client computing devices 502, 504, 506, 508, and/or 510 for techniques for selective passage of software packages (such as to a deployment tenancy), based on a signed SBOM, in accordance with the teachings of this disclosure. A client device may provide an interface that enables a user of the client device to interact with the client device. The client device may also output information to the user via this interface. Although FIG. 5 depicts only five client computing devices, any number of client computing devices may be supported.

The client devices may include various types of computing systems such as smart phones or other portable handheld devices, general purpose computers such as personal computers and laptops, workstation computers, personal assistant devices, smart watches, smart glasses, or other wearable devices, equipment firmware, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux® or Linux-like operating systems such as Oracle® Linux and Google Chrome® OS) including various mobile operating systems (e.g., Microsoft Windows Mobile®, iOS®, Windows Phone®, Android®, HarmonyOS®, Tizen®, KaiOS®, Sailfish® OS, Ubuntu® Touch, CalyxOS®). Portable handheld devices may include cellular phones, smartphones, (e.g., an iPhone®), tablets (e.g., iPad®), and the like. Virtual personal assistants such as Amazon® Alexa®, Google® Assistant, Microsoft® Cortana®, Apple® Siri®, and others may be implemented on devices with a microphone and/or camera to receive user or environmental inputs, as well as a speaker and/or display to respond to the inputs. Wearable devices may include Apple® Watch, Samsung Galaxy® Watch, Meta Quest®, Ray-Ban® Meta® smart glasses, Snap® Spectacles, and other devices. Gaming systems may include various handheld gaming devices, Internet-enabled gaming devices (e.g., a Microsoft Xbox® gaming console with or without a Kinect® gesture input device, Sony PlayStation® system, Nintendo Switch®, and other devices), and the like. The client devices may be capable of executing various different applications such as various Internet-related apps, communication applications (e.g., e-mail applications, short message service (SMS) applications) and may use various communication protocols.

Network(s) 512 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 512 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 514 may be composed of one or more general purpose computers, specialized server computers (including, by way of example, PC (personal computer) servers, UNIX® servers, LINIX® servers, mid-range servers, mainframe computers, rack-mounted servers, etc.), server farms, server clusters, a Real Application Cluster (RAC), database servers, or any other appropriate arrangement and/or combination. Server 514 can include one or more virtual machines running virtual operating systems, or other computing architectures involving virtualization such as one or more flexible pools of logical storage devices that can be virtualized to maintain virtual storage devices for the server. In various aspects, server 514 may be adapted to run one or more services or software applications that provide the functionality described in the foregoing disclosure.

The computing systems in server 514 may run one or more operating systems including any of those discussed above, as well as any commercially available server operating system. Server 514 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, SAP®, Amazon®, Sybase®, IBM® (International Business Machines), and the like.

In some implementations, server 514 may include one or more applications to analyze and consolidate data feeds and/or event updates received from users of client computing devices 502, 504, 506, 508, and/or 510. As an example, data feeds and/or event updates may include, but are not limited to, blog feeds, Threads® feeds, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 514 may also include one or more applications to display the data feeds and/or real-time events via one or more display devices of client computing devices 502, 504, 506, 508, and/or 510.

Distributed system 500 may also include one or more data repositories 516, 518. These data repositories may be used to store data and other information in certain aspects. For example, one or more of the data repositories 516, 518 may be used to store information for techniques for selective passage of software packages (such as to a deployment tenancy), based on a signed SBOM. Data repositories 516, 518 may reside in a variety of locations. For example, a data repository used by server 514 may be local to server 514 or may be remote from server 514 and in communication with server 514 via a network-based or dedicated connection. Data repositories 516, 518 may be of different types. In certain aspects, a data repository used by server 514 may be a database, for example, a relational database, a container database, an Exadata® storage device, or other data storage and retrieval tool such as databases provided by Oracle Corporation® and other vendors. One or more of these databases may be adapted to enable storage, update, and retrieval of data to and from the database in response to structured query language (SQL)-formatted commands.

In certain aspects, one or more of data repositories 516, 518 may also be used by applications to store application data. The data repositories used by applications may be of different types such as, for example, a key-value store repository, an object store repository, or a general storage repository supported by a file system.

In one embodiment, server 514 is part of a cloud-based system environment in which various services may be offered as cloud services, for a single tenant or for multiple tenants where data, requests, and other information specific to the tenant are kept private from each tenant. In the cloud-based system environment, multiple servers may communicate with each other to perform the work requested by client devices from the same or multiple tenants. The servers communicate on a cloud-side network that is not accessible to the client devices in order to perform the requested services and keep tenant data confidential from other tenants.

Figure 6:
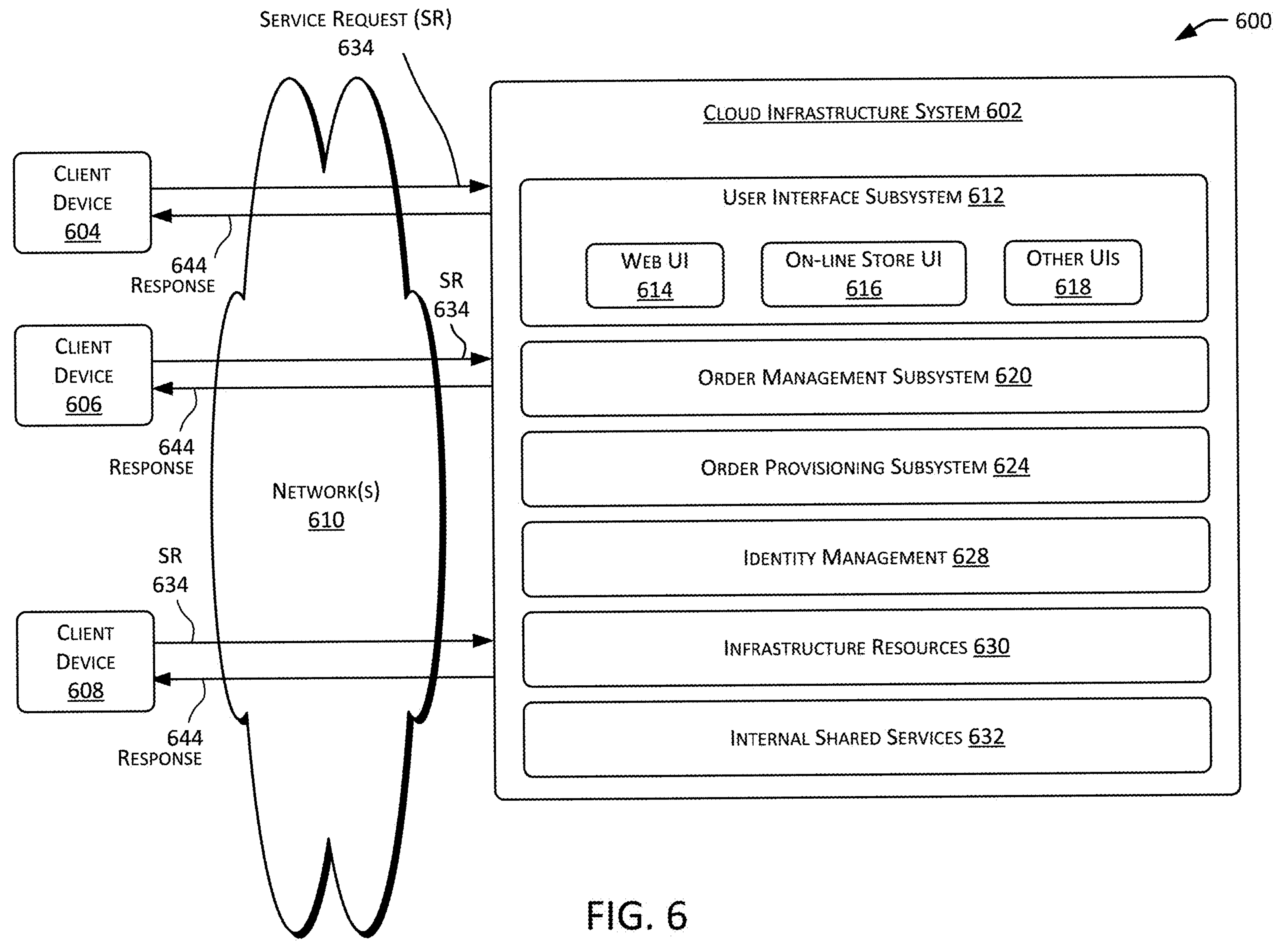
FIG. 6 is a simplified block diagram of one or more components of a system environment by which services provided by one or more components of an embodiment system may be offered as cloud services, in accordance with certain aspects.

FIG. 6 is a simplified block diagram of a cloud-based system environment in which software packages are selectively transmitted (such as to a deployment tenancy), based on a signed SBOM, in accordance with certain aspects. In the embodiment depicted in FIG. 6, cloud infrastructure system 602 may provide one or more cloud services that may be requested by users using one or more client computing devices 604, 606, and 608. Cloud infrastructure system 602 may comprise one or more computers and/or servers that may include those described above for server 512. The computers in cloud infrastructure system 602 may be organized as general purpose computers, specialized server computers, server farms, server clusters, or any other appropriate arrangement and/or combination.

Network(s) 610 may facilitate communication and exchange of data between clients 604, 606, and 608 and cloud infrastructure system 602. Network(s) 610 may include one or more networks. The networks may be of the same or different types. Network(s) 610 may support one or more communication protocols, including wired and/or wireless protocols, for facilitating the communications.

The embodiment depicted in FIG. 6 is only one example of a cloud infrastructure system and is not intended to be limiting. It should be appreciated that, in some other aspects, cloud infrastructure system 602 may have more or fewer components than those depicted in FIG. 6, may combine two or more components, or may have a different configuration or arrangement of components. For example, although FIG. 6 depicts three client computing devices, any number of client computing devices may be supported in alternative aspects.

The term cloud service is generally used to refer to a service that is made available to users on demand and via a communication network such as the Internet by systems (e.g., cloud infrastructure system 602) of a service provider. Typically, in a public cloud environment, servers and systems that make up the cloud service provider's system are different from the cloud customer's ("tenant's") own on-premise servers and systems. The cloud service provider's systems are managed by the cloud service provider. Tenants can thus avail themselves of cloud services provided by a cloud service provider without having to purchase separate licenses, support, or hardware and software resources for the services. For example, a cloud service provider's system may host an application, and a user may, via a network 610 (e.g., the Internet), on demand, order and use the application without the user having to buy infrastructure resources for executing the application. Cloud services are designed to provide easy, scalable access to applications, resources, and services. Several providers offer cloud services. For example, several cloud services are offered by Oracle Corporation®, such as database services, middleware services, application services, and others.

In certain aspects, cloud infrastructure system 602 may provide one or more cloud services using different models such as under a Software as a Service (SaaS) model, a Platform as a Service (PaaS) model, an Infrastructure as a Service (IaaS) model, a Data as a Service (DaaS) model, and others, including hybrid service models. Cloud infrastructure system 602 may include a suite of databases, middleware, applications, and/or other resources that enable provision of the various cloud services.

A SaaS model enables an application or software to be delivered to a tenant's client device over a communication network like the Internet, as a service, without the tenant having to buy the hardware or software for the underlying application. For example, a SaaS model may be used to provide tenants access to on-demand applications that are hosted by cloud infrastructure system 602. Examples of SaaS services provided by Oracle Corporation® include, without limitation, various services for human resources/capital management, client relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware, and networking resources) to a tenant as a cloud service to provide elastic compute and storage capabilities. Various IaaS services are provided by Oracle Corporation®.

A PaaS model is generally used to provide, as a service, platform and environment resources that enable tenants to develop, run, and manage applications and services without the tenant having to procure, build, or maintain such resources. Examples of PaaS services provided by Oracle Corporation® include, without limitation, Oracle Database Cloud Service (DBCS), Oracle Java Cloud Service (JCS), data management cloud service, various application development solutions services, and others.

A DaaS model is generally used to provide data as a service. Datasets may searched, combined, summarized, and downloaded or placed into use between applications. For example, user profile data may be updated by one application and provided to another application. As another example, summaries of user profile information generated based on a dataset may be used to enrich another dataset.

Cloud services are generally provided on an on-demand self-service basis, subscription-based, elastically scalable, reliable, highly available, and secure manner. For example, a tenant, via a subscription order, may order one or more services provided by cloud infrastructure system 602. Cloud infrastructure system 602 then performs processing to provide the services requested in the tenant's subscription order. Cloud infrastructure system 602 may be configured to provide one or even multiple cloud services.

Cloud infrastructure system 602 may provide the cloud services via different deployment models. In a public cloud model, cloud infrastructure system 602 may be owned by a third party cloud services provider and the cloud services are offered to any general public tenant, where the tenant can be an individual or an enterprise. In certain other aspects, under a private cloud model, cloud infrastructure system 602 may be operated within an organization (e.g., within an enterprise organization) and services provided to clients that are within the organization. For example, the clients may be various departments or employees or other individuals of departments of an enterprise such as the Human Resources department, the Payroll department, etc., or other individuals of the enterprise. In certain other aspects, under a community cloud model, the cloud infrastructure system 602 and the services provided may be shared by several organizations in a related community. Various other models such as hybrids of the above mentioned models may also be used.

Client computing devices 604, 606, and 608 may be of different types (such as devices 502, 504, 506, and 508 depicted in FIG. 5) and may be capable of operating one or more client applications. A user may use a client device to interact with cloud infrastructure system 602, such as to request a service provided by cloud infrastructure system 602.

In some aspects, the processing performed by cloud infrastructure system 602 for providing chatbot services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 602 for determining the intent of an utterance. The data used for this analysis may include structured data (e.g., data stored in a database or structured according to a structured model) and/or unstructured data (e.g., data blobs (binary large objects)).

As depicted in the embodiment in FIG. 6, cloud infrastructure system 602 may include infrastructure resources 630 that are utilized for facilitating the provision of various cloud services offered by cloud infrastructure system 602. Infrastructure resources 630 may include, for example, processing resources, storage or memory resources, networking resources, and the like.

In certain aspects, to facilitate efficient provisioning of these resources for supporting the various cloud services provided by cloud infrastructure system 602 for different tenants, the resources may be bundled into sets of resources or resource modules (also referred to as "pods"). Each resource module or pod may comprise a pre-integrated and optimized combination of resources of one or more types. In certain aspects, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 602 may itself internally use services 632 that are shared by different components of cloud infrastructure system 602 and which facilitate the provisioning of services by cloud infrastructure system 602. These internal shared services may include, without limitation, a security and identity service, an integration service, an enterprise repository service, an enterprise manager service, a virus scanning and whitelist service, a high availability, backup and recovery service, service for enabling cloud support, an email service, a notification service, a file transfer service, and the like.

Cloud infrastructure system 602 may comprise multiple subsystems. These subsystems may be implemented in software, or hardware, or combinations thereof. As depicted in FIG. 6, the subsystems may include a user interface subsystem 612 that enables users of cloud infrastructure system 602 to interact with cloud infrastructure system 602. User interface subsystem 612 may include various different interfaces such as a web interface 614, an online store interface 616 where cloud services provided by cloud infrastructure system 602 are advertised and are purchasable by a consumer, and other interfaces 618. For example, a tenant may, using a client device, request (service request 634) one or more services provided by cloud infrastructure system 602 using one or more of interfaces 614, 616, and 618. For example, a tenant may access the online store, browse cloud services offered by cloud infrastructure system 602, and place a subscription order for one or more services offered by cloud infrastructure system 602 that the tenant wishes to subscribe to. The service request may include information identifying the tenant and one or more services that the tenant desires to subscribe to.

In certain aspects, such as the embodiment depicted in FIG. 6, cloud infrastructure system 602 may comprise an order management subsystem (OMS) 620 that is configured to process the new order. As part of this processing, OMS 620 may be configured to: create an account for the tenant, if not done already; receive billing and/or accounting information from the tenant that is to be used for billing the tenant for providing the requested service to the tenant; verify the tenant information; upon verification, book the order for the tenant; and orchestrate various workflows to prepare the order for provisioning.

Once properly validated, OMS 620 may then invoke the order provisioning subsystem (OPS) 624 that is configured to provision resources for the order including processing, memory, and networking resources. The provisioning may include allocating resources for the order and configuring the resources to facilitate the service requested by the tenant order. The manner in which resources are provisioned for an order and the type of the provisioned resources may depend upon the type of cloud service that has been ordered by the tenant. For example, according to one workflow, OPS 624 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting tenant for providing the requested service.

Cloud infrastructure system 602 may send a response or notification 644 to the requesting tenant to indicate when the requested service is now ready for use. In some instances, information (e.g., a link) may be sent to the tenant that enables the tenant to start using and availing the benefits of the requested services.

Cloud infrastructure system 602 may provide services to multiple tenants. For each tenant, cloud infrastructure system 602 is responsible for managing information related to one or more subscription orders received from the tenant, maintaining tenant data related to the orders, and providing the requested services to the tenant or clients of the tenant. Cloud infrastructure system 602 may also collect usage statistics regarding a tenant's use of subscribed services. For example, statistics may be collected for the amount of storage used, the amount of data transferred, the number of users, and the amount of system up time and system down time, and the like. This usage information may be used to bill the tenant. Billing may be done, for example, on a monthly cycle.

Cloud infrastructure system 602 may provide services to multiple tenants in parallel. Cloud infrastructure system 602 may store information for these tenants, including possibly proprietary information. In certain aspects, cloud infrastructure system 602 comprises an identity management subsystem (IMS) 628 that is configured to manage tenant's information and provide the separation of the managed information such that information related to one tenant is not accessible by another tenant. IMS 628 may be configured to provide various security-related services such as identity services, such as information access management, authentication and authorization services, services for managing tenant identities and roles and related capabilities, and the like.

Figure 7:
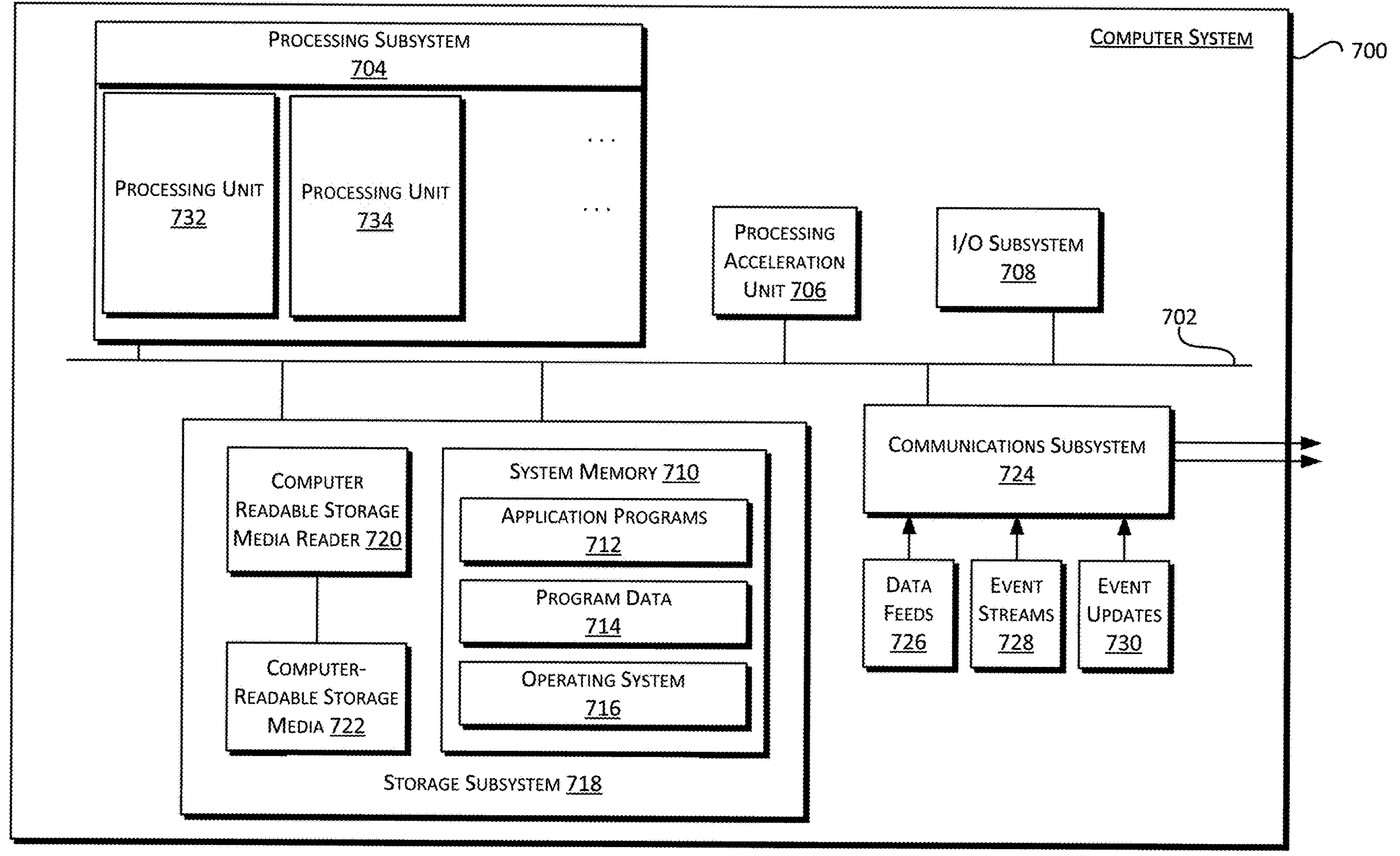
FIG. 7 illustrates an example computer system that may be used to implement certain aspects.

FIG. 7 illustrates an exemplary computer system 700 that may be used to implement certain aspects. As shown in FIG. 7, computer system 700 includes various subsystems including a processing subsystem 704 that communicates with a number of other subsystems via a bus subsystem 702. These other subsystems may include a processing acceleration unit 706, an I/O subsystem 708, a storage subsystem 718, and a communications subsystem 724. Storage subsystem 718 may include non-transitory computer-readable storage media including storage media 722 and a system memory 710.

Bus subsystem 702 provides a mechanism for letting the various components and subsystems of computer system 700 communicate with each other as intended. Although bus subsystem 702 is shown schematically as a single bus, alternative aspects of the bus subsystem may utilize multiple buses. Bus subsystem 702 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 704 controls the operation of computer system 700 and may comprise one or more processors, application specific integrated circuits (ASICs), or field programmable gate arrays (FPGAs). The processors may be single core or multicore processors. The processing resources of computer system 700 can be organized into one or more processing units 732, 734, etc. A processing unit may include one or more processors, one or more cores from the same or different processors, a combination of cores and processors, or other combinations of cores and processors. In some aspects, processing subsystem 704 can include one or more special purpose co-processors such as graphics processors, digital signal processors (DSPs), or the like. In some aspects, some or all of the processing units of processing subsystem 704 can be implemented using customized circuits, such as application specific integrated circuits (ASICs), or field programmable gate arrays (FPGAs).

In some aspects, the processing units in processing subsystem 704 can execute instructions stored in system memory 710 or on computer readable storage media 722. In various aspects, the processing units can execute a variety of programs or code instructions and can maintain multiple concurrently executing programs or processes. At any given time, some or all of the program code to be executed can be resident in system memory 710 and/or on computer-readable storage media 722 including potentially on one or more storage devices. Through suitable programming, processing subsystem 704 can provide various functionalities described above. In instances where computer system 700 is executing one or more virtual machines, one or more processing units may be allocated to each virtual machine.

In certain aspects, a processing acceleration unit 706 may optionally be provided for performing customized processing or for off-loading some of the processing performed by processing subsystem 704 so as to accelerate the overall processing performed by computer system 700.

I/O subsystem 708 may include devices and mechanisms for inputting information to computer system 700 and/or for outputting information from or via computer system 700. In general, use of the term input device is intended to include all possible types of devices and mechanisms for inputting information to computer system 700. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Meta Quest® controller, Microsoft Kinect® motion sensor, the Microsoft Xbox® 360 game controller, or devices that provide an interface for receiving input using gestures and spoken commands. User interface input devices may also include eye gesture recognition devices such as a blink detector that detects eye activity (e.g., "blinking" while taking pictures and/or making a menu selection) from users and transforms the eye gestures as inputs to an input device. Additionally, user interface input devices may include voice recognition sensing devices that enable users to interact with voice recognition systems (e.g., Siri® navigator or Amazon Alexa®) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, QR code readers, barcode readers, 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments, and the like.

In general, use of the term output device is intended to include all possible types of devices and mechanisms for outputting information from computer system 700 to a user or other computer. User interface output devices may include a display subsystem, indicator lights, or non-visual displays such as audio output devices, etc. The display subsystem may be any device for outputting a digital picture. Example display devices include flat panel display devices such as those using a light emitting diode (LED) display, a liquid crystal display (LCD) or plasma display, a projection device, a touch screen, a desktop or laptop computer monitor, and the like. As another example, wearable display devices such as Meta Quest® or Microsoft HoloLens® may be mounted to the user for displaying information. User interface output devices may include, without limitation, a variety of display devices that visually convey text, graphics, and audio/video information such as monitors, printers, speakers, headphones, automotive navigation systems, plotters, voice output devices, and modems.

Storage subsystem 718 provides a repository or data store for storing information and data that is used by computer system 700. Storage subsystem 718 provides a tangible non-transitory computer-readable storage medium for storing the basic programming and data constructs that provide the functionality of some aspects. Storage subsystem 718 may store software (e.g., programs, code modules, instructions) that when executed by processing subsystem 704 provides the functionality described above. The software may be executed by one or more processing units of processing subsystem 704. Storage subsystem 718 may also provide a repository for storing data used in accordance with the teachings of this disclosure.

Storage subsystem 718 may include one or more non-transitory memory devices, including volatile and non-volatile memory devices. As shown in FIG. 7, storage subsystem 718 includes a system memory 710 and a computer-readable storage media 722. System memory 710 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 700, such as during start-up, may typically be stored in the ROM. The RAM typically contains data and/or program modules that are presently being operated and executed by processing subsystem 704. In some implementations, system memory 710 may include multiple different types of memory, such as static random access memory (SRAM), dynamic random access memory (DRAM), and the like.

By way of example, and not limitation, as depicted in FIG. 7, system memory 710 may load application programs 712 that are being executed, which may include various applications such as Web browsers, mid-tier applications, relational database management systems (RDBMS), etc., program data 714, and an operating system 716. By way of example, operating system 716 may include various versions of Microsoft Windows®, Apple Macintosh®, and/or Linux® operating systems, a variety of commercially-available UNIX® or UNIX-like operating systems (including without limitation the variety of GNU/Linux operating systems, the Oracle Linux®, Google Chrome® OS, and the like) and/or mobile operating systems such as iOS, Windows® Phone, Android® OS, and others.

Computer-readable storage media 722 may store programming and data constructs that provide the functionality of some aspects. Computer-readable media 722 may provide storage of computer-readable instructions, data structures, program modules, and other data for computer system 700. Software (programs, code modules, instructions) that, when executed by processing subsystem 704 provides the functionality described above, may be stored in storage subsystem 718. By way of example, computer-readable storage media 722 may include non-volatile memory such as a hard disk drive, a magnetic disk drive, an optical disk drive such as a CD ROM, digital video disc (DVD), a Blu-Ray® disk, or other optical media. Computer-readable storage media 722 may include, but is not limited to, Zip® drives, flash memory cards, universal serial bus (USB) flash drives, secure digital (SD) cards, DVD disks, digital video tape, and the like. Computer-readable storage media 722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, dynamic random access memory (DRAM)-based SSDs, magnetoresistive RAM (MRAM) SSDs, and hybrid SSDs that use a combination of DRAM and flash memory based SSDs.

In certain aspects, storage subsystem 718 may also include a computer-readable storage media reader 720 that can further be connected to computer-readable storage media 722. Reader 720 may receive and be configured to read data from a memory device such as a disk, a flash drive, etc.

In certain aspects, computer system 700 may support virtualization technologies, including but not limited to virtualization of processing and memory resources. For example, computer system 700 may provide support for executing one or more virtual machines. In certain aspects, computer system 700 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 700. Accordingly, multiple operating systems may potentially be run concurrently by computer system 700.

Communications subsystem 724 provides an interface to other computer systems and networks. Communications subsystem 724 serves as an interface for receiving data from and transmitting data to other systems from computer system 700. For example, communications subsystem 724 may enable computer system 700 to establish a communication channel to one or more client devices via the Internet for receiving and sending information from and to the client devices.

Communication subsystem 724 may support both wired and/or wireless communication protocols. For example, in certain aspects, communications subsystem 724 may include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.XX family standards, or other mobile communication technologies, or any combination thereof), global positioning system (GPS) receiver components, and/or other components. In some aspects communications subsystem 724 can provide wired network connectivity (e.g., Ethernet) in addition to or instead of a wireless interface.

Communication subsystem 724 can receive and transmit data in various forms. For example, in some aspects, in addition to other forms, communications subsystem 724 may receive input communications in the form of structured and/or unstructured data feeds 726, event streams 728, event updates 730, and the like. For example, communications subsystem 724 may be configured to receive (or send) data feeds 726 in real-time from users of social media networks and/or other communication services such as Twitter® feeds, Facebook® updates, web feeds such as Rich Site Summary (RSS) feeds, and/or real-time updates from one or more third party information sources.

In certain aspects, communications subsystem 724 may be configured to receive data in the form of continuous data streams, which may include event streams 728 of real-time events and/or event updates 730, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 724 may also be configured to communicate data from computer system 700 to other computer systems or networks. The data may be communicated in various different forms such as structured and/or unstructured data feeds 726, event streams 728, event updates 730, and the like to one or more databases that may be in communication with one or more streaming data source computers coupled to computer system 700.

Computer system 700 can be one of various types, including a handheld portable device (e.g., an iPhone® cellular phone, an iPad® computing tablet, a personal digital assistant (PDA)), a wearable device (e.g., a Meta Quest® head mounted display), a personal computer, a workstation, a mainframe, a kiosk, a server rack, or any other data processing system. Due to the ever-changing nature of computers and networks, the description of computer system 700 depicted in FIG. 7 is intended only as a specific example. Many other configurations having more or fewer components than the system depicted in FIG. 7 are possible. Based on the disclosure and teachings provided herein, a person of ordinary skill in the art can appreciate other ways and/or methods to implement the various aspects.

Although specific aspects have been described, various modifications, alterations, alternative constructions, and equivalents are possible. Embodiments are not restricted to operation within certain specific data processing environments, but are free to operate within a plurality of data processing environments. Additionally, although certain aspects have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described aspects may be used individually or jointly.

Further, while certain aspects have been described using a particular combination of hardware and software, it should be recognized that other combinations of hardware and software are also possible. Certain aspects may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the aspects. However, aspects may be practiced without these specific details. For example, well-known circuits, processes, algorithms, structures, and techniques have been shown without unnecessary detail in order to avoid obscuring the aspects. This description provides example aspects only, and is not intended to limit the scope, applicability, or configuration of other aspects. Rather, the preceding description of the aspects can provide those skilled in the art with an enabling description for implementing various aspects. Various changes may be made in the function and arrangement of elements.

The specification and drawings are, accordingly, to be regarded in an illustrative rather than a restrictive sense. It can, however, be evident that additions, subtractions, deletions, and other modifications and changes may be made thereunto without departing from the broader spirit and scope as set forth in the claims. Thus, although specific aspects have been described, these are not intended to be limiting. Various modifications and equivalents are within the scope of the following claims.

What is claimed is:

1. A method comprising:

receiving a first software bill of material (SBOM) that is generated for a first software package, wherein the first software package is built from a source code;

analyzing one or more of (i) the first SBOM, (ii) at least first one or more sections of the source code, and (iii) an intermediate representation of at least second one or more sections of the source code, to evaluate for a presence of security risks, vulnerabilities, anomalies, and/or one or more other issues within the source code;

upon detecting absence of security risks, vulnerabilities, anomalies, and/or one or more other issues within the source code, digitally signing the first SBOM, to generate a first signed SBOM;

receiving (i) a second software package from a first tenancy of a cloud environment and (ii) the first signed SBOM from a second tenancy of the cloud environment;

validating a first digital signature of the first signed SBOM;

subsequent to validating the first digital signature of the first signed SBOM, comparing the first signed SBOM with the second software package;

determining, based at least in part on the comparing, that the first signed SBOM corresponds to the second software package;

responsive at least in part on determining that the first signed SBOM corresponds to the second software package, allowing passage of the second software package; and responsive at least in part on determining that a second signed SBOM does not correspond to a third software package, preventing passage of the third software package.

2. The method of claim 1, wherein the second software package is received and compared by a verification service, and wherein determining that the first signed SBOM corresponds to the second software package comprises:

determining that the first software package has not been modified since the generation of the first SBOM, and the unmodified first software package is received by the verification service as the second software package.

3. The method of claim 1, wherein the first SBOM comprises one or more of (i) identification of one or more software components of the first software package, (ii) identification of one or more libraries of the first software package, and (iii) hash values of one or more components of the first software package.

4. The method of claim 1, wherein the first SBOM uniquely identifies the first software package, such that any revision to the first software package results in a mismatch between a revised version of the first software package and the first SBOM.

5. The method of claim 1, wherein the first software package and the second software package are the same.

6. The method of claim 1, further comprising:

building, by a build pipeline, the first software package from the source code; and generating, by one or more plugins within the build pipeline, one or more of (i) the first SBOM and (ii) the intermediate representation.

7. The method of claim 1, wherein:

the first software package is built within the first tenancy or a third tenancy of the cloud environment;

the first SBOM is generated from the first software package within the first tenancy or the third tenancy of the cloud environment;

the intermediate representation is generated from the source code within the first tenancy or the third tenancy of the cloud environment; and the analysis of one or more of (i) the first SBOM, (ii) at least first one or more sections of the source code, and (iii) the intermediate representation is performed within the second tenancy or a fourth tenancy of the cloud environment, the second tenancy being different from the first tenancy.

8. The method of claim 7, wherein digitally signing the first SBOM and/or determining that the first signed SBOM corresponds to the second software package are performed within one of (i) the second tenancy of the cloud environment or (ii) the fourth tenancy of the cloud environment, the fourth tenancy being different from the first tenancy.

9. The method of claim 7, wherein the first tenancy of the cloud environment is controlled by a cloud customer and second tenancy of the cloud environment is controlled by an assurance administrator.

10. The method of claim 1, wherein allowing passage of the second software package comprises allowing passage of the second software package to a deployment tenancy of a cloud environment, from where the second software package is to be deployed to a plurality of end user devices or to a cloud-based server.

11. The method of claim 1, wherein the source code is first source code, and wherein the method further comprises:

receiving a second SBOM that is generated for a fourth software package, wherein the fourth software package is built from a second source code;

analyzing one or more of (i) the second SBOM, (ii) at least third one or more sections of the second source code, and (iii) another intermediate representation of at least fourth one or more sections of the second source code;

digitally signing the second SBOM to generate the second signed SBOM;

receiving the third software package;

validating a second digital signature of the second signed SBOM;

subsequent to validating the second digital signature of the second signed SBOM, comparing the second signed SBOM with the third software package;

determining, based at least in part on the comparing the second signed SBOM with the third software package, that the second signed SBOM does not correspond to the third software package.

12. The method of claim 11, wherein the second software package is allowed passage to a deployment tenancy of the cloud environment, wherein a plurality of software packages are deployed from the deployment tenancy, the plurality of software packages including the second software package and excluding the third software package.

13. The method of claim 1, wherein the source code is first source code, and wherein the method further comprises:

receiving a third SBOM that is generated for a fourth software package, wherein the fourth software package is built from a second source code;

analyzing one or more of (i) the third SBOM, (ii) at least third one or more sections of the second source code, and (iii) another intermediate representation of at least fourth one or more sections of the second source code;

detecting one or more security vulnerabilities within the fourth software package and/or the second source code; and causing revision of the second source code, responsive at least in part on detecting the one or more security vulnerabilities within the fourth software package and/or the second source code.

14. A non-transitory computer-readable medium including instructions that when executed by one or more processors, cause a system comprising the one or more processors to perform operations including:

receiving a first software bill of material (SBOM) that is generated for a first software package, wherein the first software package is built from a source code;

analyzing one or more of (i) the first SBOM, (ii) at least first one or more sections of the source code, and (iii) an intermediate representation of at least second one or more sections of the source code, to evaluate for a presence of security risks, vulnerabilities, anomalies, and/or one or more other issues within the first software package and/or the source code;

upon detecting absence of security risks, vulnerabilities, anomalies, and/or one or more other issues, digitally signing the first SBOM to generate a first signed SBOM;

receiving (i) a second software package from a first tenancy of a cloud environment and (ii) the first signed SBOM from a second tenancy of the cloud environment;

validating a first digital signature of the first signed SBOM;

subsequent to validating the first digital signature of the first signed SBOM, comparing the first signed SBOM with the second software package;

determining, based at least in part on the comparing, that the first signed SBOM corresponds to the second software package;

responsive at least in part on determining that the first signed SBOM corresponds to the second software package, allowing passage of the second software package; and responsive at least in part on determining that a second signed SBOM does not correspond to a third software package, preventing passage of the third software package.

15. The non-transitory computer-readable medium of claim 14, wherein allowing passage of the second software package comprises:

allowing passage of the second software package to a deployment tenancy of the cloud environment, from where the second software package is to be deployed to a plurality of end user devices or to a cloud-based server.

16. The non-transitory computer-readable medium of claim 14, wherein the second software package is received and compared by a verification service, and wherein determining that the first signed SBOM corresponds to the second software package comprises:

determining that the first software package has not been modified since the generation of the first SBOM, and the unmodified first software package is received by the verification service as the second software package.

17. A system comprising:

one or more processors; and one or more non-transitory computer-readable media storing instructions, which, when executed by the system, cause the system to perform a set of actions including:

receiving a first software bill of material (SBOM) that is generated for a first software package, wherein the first software package is built from a source code;

analyzing one or more of (i) the first SBOM, (ii) at least first one or more sections of the source code, and (iii) an intermediate representation of at least second one or more sections of the source code;

responsive at least in part on passing the analyzing, digitally signing the first SBOM to generate a first signed SBOM;

receiving (i) a second software package from a first tenancy of a cloud environment and (ii) the first signed SBOM from a second tenancy of the cloud environment;

validating a first digital signature of the first signed SBOM;

subsequent to validating the first digital signature of the first signed SBOM, comparing the first signed SBOM with the second software package;

determining, based at least in part on the comparing, that the first signed SBOM corresponds to the second software package; and responsive at least in part on determining that the first signed SBOM corresponds to the second software package, allowing passage of the second software package; and responsive at least in part on determining that a second signed SBOM does not correspond to a third software package, preventing passage of the third software package.

18. The system of claim 17, wherein the second software package is received and compared by a verification service, and wherein determining that the first signed SBOM corresponds to the second software package comprises:

determining that the first software package has not been modified since the generation of the first SBOM, and the unmodified first software package is received by the verification service as the second software package.

* * * * *